United States Patent
Araki

(10) Patent No.: US 12,054,625 B2
(45) Date of Patent: Aug. 6, 2024

(54) ACTIVE ENERGY RAY-CURABLE INK, INK SET, AND IMAGE RECORDING METHOD

(71) Applicant: FUJIFILM Corporation, Tokyo (JP)

(72) Inventor: Kenjiro Araki, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 136 days.

(21) Appl. No.: 17/740,294

(22) Filed: May 9, 2022

(65) Prior Publication Data

US 2022/0275235 A1 Sep. 1, 2022

Related U.S. Application Data

(63) Continuation of application No. PCT/JP2020/040949, filed on Oct. 30, 2020.

(30) Foreign Application Priority Data

Nov. 11, 2019 (JP) .................................. 2019-204275

(51) Int. Cl.
| | |
|---|---|
| C09D 11/38 | (2014.01) |
| B41J 11/00 | (2006.01) |
| B41M 5/00 | (2006.01) |
| C09D 11/40 | (2014.01) |

(52) U.S. Cl.
CPC ......... C09D 11/38 (2013.01); B41J 11/00214 (2021.01); B41M 5/0023 (2013.01); C09D 11/40 (2013.01)

(58) Field of Classification Search
CPC ............ B41J 11/00214; B41M 5/0023; B41M 7/0081; C09D 11/40; C09D 11/101; C09D 11/12

See application file for complete search history.

(56) References Cited

U.S. PATENT DOCUMENTS

| | | | |
|---|---|---|---|
| 6,593,390 | B1 | 7/2003 | Johnson et al. |
| 9,101,955 | B2 | 8/2015 | Araki et al. |
| 2003/0158283 | A1 | 8/2003 | Ylitalo et al. |
| 2008/0063799 | A1 | 3/2008 | Tennis et al. |
| 2011/0200794 | A1 | 8/2011 | Kida et al. |
| 2012/0069082 | A1 | 3/2012 | Hayata |
| 2013/0295342 | A1 | 11/2013 | Araki et al. |
| 2014/0275319 | A1 | 9/2014 | Yamada et al. |
| 2015/0353751 | A1 | 12/2015 | Umebayashi |
| 2017/0165994 | A1 | 6/2017 | Takabayashi |
| 2018/0362279 | A1 | 12/2018 | Yoshida et al. |
| 2019/0315978 | A1 | 10/2019 | Holzinger |

FOREIGN PATENT DOCUMENTS

| | | |
|---|---|---|
| CN | 1301284 | 6/2001 |
| CN | 103374259 | 10/2013 |
| CN | 103842450 | 6/2014 |
| EP | 2682272 | 1/2014 |
| EP | 2832553 | 2/2015 |
| JP | 2004522813 | 7/2004 |
| JP | 2010506748 | 3/2010 |
| JP | 2010138298 | 6/2010 |
| JP | 2012067178 | 4/2012 |
| JP | 2012177026 | 9/2012 |
| JP | 2012180391 | 9/2012 |
| JP | 2015047746 | 3/2015 |
| JP | 2018168321 | 11/2018 |
| JP | 2019508534 | 3/2019 |
| WO | 2015133605 | 9/2015 |

OTHER PUBLICATIONS

"Search Report of Europe Counterpart Application", issued on Dec. 2, 2022, pp. 1-7.
"International Search Report (Form PCT/ISA/210) of PCT/JP2020/040949," mailed on Dec. 28, 2020, with English translation thereof, pp. 1-6.
"Written Opinion of the International Searching Authority (Form PCT/ISA/237)" of PCT/JP2020/040949, mailed on Dec. 28, 2020, with English translation thereof, pp. 1-8.
"Notice of Reasons for Refusal of Japan Counterpart Application", issued on May 9, 2023, with English translation thereof, p. 1-p. 12.
Office Action of China Counterpart Application, with English translation thereof, issued on Dec. 1, 2022, pp. 1-22.
Shichang Liu, "Printing quality inspection and control" , Printing Industry Press, May 2000, with Partial English translation, pp. 1-7.
Zhu Ling et al., "UV curable ink for ink-jet textile printing", Shanghai Textile Science & Technology, vol. 33, Issue 10, Oct. 2005, with English abstract, pp. 14-18.
Office Action of China Counterpart Application, with English translation thereof, issued on Jun. 3, 2023, pp. 1-23.
Tibetan Guangzhou et al., "The latest printing technology practical handbook letterpress printing technology sub-volume", Anhui Audio-visual Publishing House, Nov. 2003, with Partial English translation, pp. 1-4.

*Primary Examiner* — Lisa Solomon
(74) *Attorney, Agent, or Firm* — JCIPRNET

(57) ABSTRACT

Provided are an active energy ray-curable ink that includes a photopolymerizable monomer, a photopolymerization initiator, and a colorant, wherein the photopolymerizable monomer includes a monomer A1 having a surface tension of 31.0 mN/m or less, the photopolymerizable monomer has an average surface tension of 31.0 mN/m or less, and the content of a surfactant is 0.01% by mass or less of the total amount of the active energy ray-curable ink, an ink set, and an image recording method.

12 Claims, No Drawings

ACTIVE ENERGY RAY-CURABLE INK, INK SET, AND IMAGE RECORDING METHOD

CROSS-REFERENCE TO RELATED APPLICATIONS

This application is a continuation application of International Application No. PCT/JP2020/040949, filed Oct. 30, 2020, the disclosure of which is incorporated herein by reference in its entirety. Further, this application claims priority from Japanese Patent Application No. 2019-204275, filed Nov. 11, 2019, the disclosure of which is incorporated herein by reference in its entirety.

BACKGROUND OF THE INVENTION

1. Field of the Invention

The present disclosure relates to an active energy ray-curable ink, an ink set, and an image recording method.

2. Description of the Related Art

An image recording method is known in which an ink is applied onto a recording medium and the ink deposited on the recording medium is cured by irradiation with an active energy ray, such as ultraviolet radiation, to form an image. An ink used in such an image recording method is referred to as "active energy ray-curable ink" or the like.

Known examples of the active energy ray-curable ink include an active energy ray-curable ink that includes a photopolymerizable monomer, a photopolymerization initiator, and a colorant (e.g., see JP2015-47746A and JP2012-67178A).

SUMMARY OF THE INVENTION

In an image recording method in which an ink is used, there may be demands for improvement of a recorded image in terms of graininess (i.e., a reduction in the graininess of a recorded image) and improvement of a recorded image in terms of glossiness.

For improving the image in terms of graininess and glossiness, it is effective to reduce the droplet interference between ink droplets, that is, the landing interference between the ink droplets applied onto a recording medium. For reducing the landing interference, it is effective to reduce the surface tension of the ink. One of the methods for reducing the surface tension of an ink is to add a surfactant to the ink.

On the other hand, an ink in which the content of a surfactant is reduced, such as an ink that does not include a surfactant, may be required in some cases.

Thus, there may be a demand for an active energy ray-curable ink in which the content of a surfactant is reduced and which can be used to record an image excellent in terms of graininess and glossiness.

An object of an aspect of the present disclosure is to provide an active energy ray-curable ink in which the content of a surfactant is reduced and which can be used to record an image excellent in terms of graininess and glossiness, an ink set including the active energy ray-curable ink, and an image recording method in which the active energy ray-curable ink is used.

Specific means for achieving the above object includes the following aspects.

<1> An active energy ray-curable ink including:
a photopolymerizable monomer;
a photopolymerization initiator; and
a colorant,
wherein the photopolymerizable monomer includes a monomer A1 having a surface tension of 31.0 mN/m or less,
wherein the photopolymerizable monomer has an average surface tension of 31.0 mN/m or less, and
wherein a content of a surfactant is 0.01% by mass or less of a total amount of the active energy ray-curable ink.
<2> The active energy ray-curable ink described in <1>, wherein at least one of the monomer A1 includes an alkyl group.
<3> The active energy ray-curable ink described in <1> or <2>,
wherein at least one of the monomer A1 includes an alicyclic structure.
<4> The active energy ray-curable ink described in any one of <1> to <3>,
wherein a homopolymer of at least one of the monomer A1 has a glass transition temperature of 20° C. or more.
<5> The active energy ray-curable ink described in any one of <1> to <4>,
wherein the photopolymerizable monomer further includes a monomer N1 that is an N-vinyl compound.
<6> The active energy ray-curable ink described in <5>,
wherein a mass ratio of a content of the monomer A1 to a content of the monomer N1 is 2.0 to 7.0.
<7> The active energy ray-curable ink described in any one of <1> to <6>,
wherein the content of the surfactant is 0.0001% by mass or less of the total amount of the active energy ray-curable ink.
<8> The active energy ray-curable ink described in any one of <1> to <7>,
wherein the average surface tension of the photopolymerizable monomer is 28 to 31 mN/m.
<9> The active energy ray-curable ink described in any one of <1> to <8>,
wherein a homopolymer of the photopolymerizable monomer has an average glass transition temperature of 20° C. or more.
<10> The active energy ray-curable ink described in any one of <1> to <9>, further including a gelling agent.
<11> An ink set including:
a first ink that is the active energy ray-curable ink described in any one of <1> to <10>; and
a second ink that is an active energy ray-curable ink including a photopolymerizable monomer, a photopolymerization initiator, and a colorant.
<12> An ink set including:
a first ink; and
a second ink,
wherein the first and second inks are each independently the active energy ray-curable ink described in any one of <1> to <10>.
<13> An image recording method including:
applying the active energy ray-curable ink described in any one of <1> to <10> to a recording medium to form an ink film; and
irradiating the ink film with an active energy ray.

According to an aspect of the present disclosure, an active energy ray-curable ink in which the content of a surfactant is reduced and which can be used to record an image excellent in terms of graininess and glossiness, an ink set including the active energy ray-curable ink, and an image recording method in which the active energy ray-curable ink is used are provided.

DESCRIPTION OF THE PREFERRED EMBODIMENTS

In the present disclosure, a numerical range expressed using "to" means the range specified by the lower and upper limits described before and after "to", respectively.

In the present disclosure, in the case where a composition includes a plurality of substances that correspond to a component of the composition, the content of the component in the composition is the total content of the substances in the composition unless otherwise specified.

When numerical ranges are described in a stepwise manner in the present disclosure, the upper or lower limit of a numerical range may be replaced with the upper or lower limit of another numerical range, respectively, and may also be replaced with the values described in Examples below.

The term "step" used herein refers not only to an individual step but also to a step that is not distinguishable from other steps but achieves the intended purpose of the step.

In the present disclosure, a combination of preferable aspects is a more preferable aspect.

The term "light" used herein is a concept including active energy rays, such as γ-radiation, β-radiation, electron beams, ultraviolet radiation, and visible light.

Ultraviolet radiation may be referred to as "ultraviolet (UV) light".

The concept of the term "(meth)acrylate" used herein includes both acrylate and methacrylate. The concept of the term "(meth)acryloyl group" used herein includes both acryloyl and methacryloyl groups.

The term "image" used herein refers to films formed using inks in general. The term "image recording" used herein refers to the formation of an image (i.e., a film).

The concept of the term "image" used herein includes a solid image.

Active Energy Ray-Curable Ink

An active energy ray-curable ink according to the present disclosure includes
a photopolymerizable monomer, a photopolymerization initiator, and a colorant.
The photopolymerizable monomer includes a monomer A1 having a surface tension of 31.0 mN/m or less.
The photopolymerizable monomer has an average surface tension of 31.0 mN/m or less.
The content of a surfactant is 0.01% by mass or less of the total amount of the active energy ray-curable ink.

Hereinafter, the active energy ray-curable ink is also referred to simply as "ink".

As described above, for improving the image in terms of graininess and glossiness, it is effective to reduce the landing interference between the ink droplets applied onto a recording medium. For reducing the landing interference, it is effective to reduce the surface tension of the ink. One of the methods for reducing the surface tension of an ink is to add a surfactant to the ink.

On the other hand, an ink in which the content of a surfactant is reduced, such as an ink that does not include a surfactant, may be required in some cases.

For example, in the case where an active energy ray-curable ink that includes a surfactant is applied onto a recording medium and the active energy ray-curable ink deposited on the recording medium is irradiated with an active energy ray (e.g., in the case where the pinning exposure and/or full exposure described in the "Image Recording Method" section below is performed), the surfactant may bleed on the surface of the ink film formed on the recording medium. For example, in the case where a surfactant bleeds on the surface of an ink film of a first color disposed on a recording medium and an ink of a second color is subsequently applied onto the ink film of the first color, the second color ink may be repelled by the surface of the first color ink film and/or landing interference may occur. This degrades the resulting image in terms of graininess and glossiness. Specifically, although the surfactant included in the first color ink reduces the landing interference between the droplets of the first color ink, the surfactant bleeds on the surface of the first color ink film and, consequently, the second color ink is repelled and/or landing interference occurs. Thus, the resulting secondary color image (i.e., an image formed by the inks of first and second colors) may be unsatisfactory in terms of graininess and glossiness.

With regard to the above issues, the ink according to the present disclosure can be used to record an image excellent in terms of graininess and glossiness although the content of the surfactant in the ink is reduced to 0.01% by mass or less.

The reasons for which the advantageous effects are produced are presumably because the average surface tension of the photopolymerizable monomer included in the ink according to the present disclosure (i.e., all of the photopolymerizable monomers included in the ink) is limited to 31.0 mN/m or less.

Specifically, limiting the average surface tension of the photopolymerizable monomer included in the ink according to the present disclosure to 31.0 mN/m or less reduces the surface tension of the ink and the landing interference between the ink droplets and consequently improves the image in terms of graininess and glossiness.

Photopolymerizable Monomer

The ink according to the present disclosure includes at least one photopolymerizable monomer.

The photopolymerizable monomer is a compound including a photopolymerizable group.

Examples of the photopolymerizable group include an ethylenic unsaturated group (i.e., a group including an ethylenic double bond), an epoxy group, and an oxetanyl group. Among these, an ethylenic unsaturated group is preferable.

The ethylenic unsaturated group is preferably a (meth)acryloyl group, a vinyl group, or an allyl group.

The photopolymerizable monomer may include only one photopolymerizable group or may include two or more photopolymerizable groups.

The photopolymerizable monomer preferably includes an ethylenic unsaturated group.

Examples of the photopolymerizable monomer include common photopolymerizable monomers known in the related art which are capable of polymerizing or crosslinking upon being irradiated with light (i.e., an active energy ray, such as γ-radiation, β-radiation, an electron beam, ultraviolet radiation, or visible light). The active energy ray is preferably ultraviolet radiation.

The photopolymerizable monomer included in the ink according to the present disclosure may be a monofunctional photopolymerizable monomer (hereinafter, also referred to simply as "monofunctional monomer"), may be a difunctional photopolymerizable monomer (hereinafter, also referred to simply as "difunctional monomer"), may be a trifunctional or higher photopolymerizable monomer, or may be a combination of two or more of the above monomers.

Note that, the term "monofunctional photopolymerizable monomer" used herein refers to a compound including one photopolymerizable group (preferably, one ethylenic unsaturated group), the term "difunctional photopolymerizable monomer" used herein refers to a compound including two photopolymerizable groups (preferably, two ethylenic unsaturated groups), and the term "trifunctional or higher photopolymerizable monomer" used herein refers to a compound including three or more photopolymerizable groups (preferably, three or more ethylenic unsaturated groups).

In order to reduce the viscosity of the ink, the photopolymerizable monomer included in the ink according to the present disclosure preferably includes at least one of a monofunctional photopolymerizable monomer or a difunctional photopolymerizable monomer and more preferably includes a monofunctional photopolymerizable monomer.

In this case, the total content of the monofunctional and difunctional photopolymerizable monomers in the ink is preferably 50% by mass or more, is more preferably 55% by mass or more, and is further preferably 60% by mass or more of the total amount of the ink.

The upper limit for the total content of the monofunctional and difunctional photopolymerizable monomers in the ink is not set and may be, for example, 95% by mass or 90% by mass.

The proportion of the total content of the monofunctional and difunctional photopolymerizable monomers to the total amount of all the photopolymerizable monomers included in the ink is preferably 60% by mass or more, is more preferably 65% by mass or more, and is further preferably 70% by mass or more.

The upper limit for the above proportion is not set and may be, for example, 100% by mass, 95% by mass, or 90% by mass.

The molecular weights of the photopolymerizable monomers are preferably 280 to 1,500, are more preferably 280 to 1,000, and are further preferably 280 to 800.

The content of the photopolymerizable monomers in the ink is preferably 50% by mass or more and is more preferably 60% by mass or more of the total amount of the ink.

The upper limit for the ratio of the content of the photopolymerizable monomers to the total amount of the ink is not set and may be, for example, 90% by mass.

Average Surface Tension

The average surface tension of the photopolymerizable monomers included in the ink is 31.0 mN/m or less. This reduces the surface tension of the ink as a whole. Consequently, droplet interference between ink droplets is reduced, and the recorded image is improved in terms of graininess and glossiness.

Note that the term "average surface tension" of the photopolymerizable monomers refers to the weighted average of the surface tensions of the photopolymerizable monomers included in the ink.

The weighted average of the surface tensions of the photopolymerizable monomers included in the ink is calculated using Equation 1 below.

Specifically, the weighted average of the surface tensions of the photopolymerizable monomers included in the ink is calculated as X in Equation 1 by substituting the surface tension of the i-th photopolymerizable monomer included in the ink to $S_i$ in Equation 1 and the mass fraction of the i-th photopolymerizable monomer to all of the photopolymerizable monomers included in the ink to $W_i$, where i represents an integer of 1 or more.

$$X = \Sigma S_i W_i / \Sigma W_i \quad \text{(Equation 1)}$$

The term "surface tension" used herein refers to a surface tension measured at 25° C. The measurement of surface tension can be conducted using, for example, an automatic surface tensiometer "CBVP-Z" produced by Kyowa Interface Science Co., Ltd.

The average surface tension of the photopolymerizable monomers is preferably 28 to 31 mN/m.

When the average surface tension of the photopolymerizable monomers is 28 mN/m or more, the discharge performance of an ink jet head is enhanced.

Average Glass Transition Temperature

The average glass transition temperature of homopolymers of the photopolymerizable monomers is preferably −30° C. or more.

When the above average glass transition temperature is −30° C. or more, the image is further improved in terms of graininess, glossiness, and adhesiveness (i.e., adhesiveness of the image to recording media).

The term "average glass transition temperature" of homopolymers of the photopolymerizable monomers refers to the weighted average of the glass transition temperatures of homopolymers of the photopolymerizable monomers included in the ink.

The method for calculating the weighted average of the glass transition temperatures of the homopolymers is the same as the method for determining the weighted average in the calculation of average surface tension.

Hereinafter, the average glass transition temperature of homopolymers of the photopolymerizable monomers is also referred to simply as "average glass transition temperature of photopolymerizable monomers" or "average Tg of photopolymerizable monomers".

In order to further enhance the adhesiveness of the image, the average Tg of the photopolymerizable monomers is preferably −20° C. or more, is more preferably 0° C. or more, is further preferably 20° C. or more, is further preferably 30° C. or more, and is further preferably 40° C. or more.

In order to further enhance the adhesiveness of the image, the average Tg of the photopolymerizable monomers is preferably 80° C. or less and is more preferably 60° C. or less.

The homopolymers of the photopolymerizable monomers used in the measurement of the average glass transition temperature of homopolymers of the photopolymerizable monomers are each prepared by polymerizing the photopolymerizable monomer such that the weight-average molecular weight of the resulting homopolymer reaches 10,000.

The term "weight-average molecular weight" used herein refers to a weight-average molecular weight determined by gel permeation chromatography (GPC).

In the measurement by gel permeation chromatography (GPC), measuring equipment "HLC (registered trademark)-8020GPC" produced by Tosoh Corporation, three columns "TSKgel (registered trademark) Super Multipore HZ-H"

(4.6 mmID×15 cm) produced by Tosoh Corporation, and tetrahydrofuran (THF) that serves as an eluent are used. The measurement conditions are as follows: sample concentration: 0.45% by mass, flow rate: 0.35 ml/min, sample injection volume: 10 μl, temperature: 40° C., detector: RI detector.

A calibration curve is prepared using the following eight reference samples: "TSK Standard Polystyrene F-40", "F-20", "F-4", "F-1", "A-5000", "A-2500", "A-1000", and "n-propylbenzene" produced by Tosoh Corporation.

The glass transition temperature of a homopolymer of each of the photopolymerizable monomers is measured by differential scanning calorimetry (DSC).

Specifically, the measurement of glass transition temperature is conducted in accordance with the method described in JIS K 7121(1987) or JIS K 6240 (2011).

The term "glass transition temperature" used herein refers to extrapolated glass transition start temperature (hereinafter, also referred to as "Tig").

The method for measuring glass transition temperature is specifically described below.

In the measurement of the glass transition temperature of a resin, holding is performed at a temperature lower than the expected glass transition temperature of the resin by about 50° C. until the apparatus becomes stabilized. Subsequently, heating is performed at a heating rate of 20° C./min to a temperature higher than the temperature at which glass transition is terminated by about 30° C. Then, a differential thermal analysis (DTA) curve or a DSC curve is prepared.

The extrapolated glass transition start temperature (Tig), that is, the glass transition temperature in the present disclosure, is determined as a temperature at the point at which a straight line formed by extending the base line of the DTA or DSC curve on a low-temperature side toward a high-temperature side intersects a tangent to a stepwise-changing part of the DTA or DSC curve, which corresponds to glass transition, at the point at which the gradient of the curve is the maximum.

Monomer A1

The photopolymerizable monomer included in the ink according to the present disclosure includes a monomer A1 having a surface tension of 31.0 mN/m or less.

Thus, the monomer A1 corresponds to, of the above-described photopolymerizable monomers, a monomer which has a surface tension of 31.0 mN/m or less.

Preferable examples of the monomer A1 are the same as preferable examples of the photopolymerizable monomer.

The number of the monomers A1 included in the photopolymerizable monomers included in the ink according to the present disclosure may be only one or two or more.

The surface tension of the monomer A1 is preferably 26.0 to 31.0 mN/m.

When the surface tension of the monomer A1 is 26.0 mN/m or more, the discharge performance of an ink jet head is further enhanced.

The monomer A1 is not limited and may be any photopolymerizable monomer having a surface tension of 31.0 mN/m or less. The monomer A1 is preferably a (meth)acrylate compound and is more preferably an acrylate compound.

The monomer A1 is preferably a monofunctional or difunctional monomer and is more preferably a monofunctional monomer.

It is preferable that at least one of the monomers A1 include an alkyl group. In such a case, the image is further improved in terms of graininess, glossiness, and adhesiveness.

The above alkyl group may be a linear alkyl group or an alkyl group including at least one of a branched structure or an alicyclic structure.

The number of carbon atoms included in the alkyl group is preferably 2 or more, is more preferably 6 or more, and is further preferably 8 or more. The upper limit for the number of carbon atoms included in the alkyl group is preferably 30 and is more preferably 25.

The alicyclic structure is preferably an alicyclic structure including only one ring and is more preferably an alicyclic structure including a six-membered ring.

In the case where at least one of the monomers A1 includes an alkyl group, the proportion of the content of the monomer A1 including an alkyl group to the total content of the monomers A1 (i.e., the total content of the monomer A1 which includes an alkyl group and the monomers A1 that do not include an alkyl group) is preferably 50% to 100% by mass, is more preferably 60% to 100% by mass, and is further preferably 80% to 100% by mass.

In the case where at least one of the monomers A1 includes an alkyl group, the content of the monomer A1 including an alkyl group is preferably 15% by mass or more, is more preferably 30% by mass or more, and is further preferably 40% by mass or more of the total amount of the ink.

The upper limit for the ratio of the content of the monomer A1 including an alkyl group to the total amount of the ink is not set and may be, for example, 95% by mass or 90% by mass.

It is more preferable that at least one of the monomers A1 include an alicyclic structure. In such a case, the image is further improved in terms of graininess, glossiness, and adhesiveness.

Preferable examples of the alicyclic structure are as described above.

In the case where at least one of the monomers A1 includes an alicyclic structure, the content of the monomer A1 including an alicyclic structure is preferably 10% to 100% by mass, is more preferably 20% to 100% by mass, is further preferably 30% to 100% by mass, and is further preferably 40% to 100% by mass of the total content of the monomers A1 (i.e., the total content of the monomer A1 which includes an alicyclic structure and the monomers A1 that do not include an alicyclic structure).

In the case where at least one of the monomers A1 includes an alicyclic structure, the content of the monomer A1 including an alicyclic structure is preferably 10% to 90% by mass, is more preferably 20% to 80% by mass, and is further preferably 25% to 70% by mass of the total amount of the ink.

The glass transition temperature (Tg) of at least one of the homopolymers of the monomers A1 is preferably, but not limited to, −70° C. or more, is more preferably −60° C. or more, is further preferably −50° C. or more, is further preferably 0° C. or more, is further preferably 20° C. or more, is further preferably 30° C. or more, and is further preferably 40° C. or more in order to further improve the image in terms of graininess, glossiness, and adhesiveness.

The upper limit for the Tg of the homopolymer is, for example, 100° C. and is preferably 80° C.

In the case where at least one of the homopolymers of the monomers A1 has a glass transition temperature (Tg) of 20° C. or more, the content of the monomer A1 the homopolymer of which has a Tg of 20° C. or more is preferably 10% to 100% by mass, is more preferably 20% to 100% by mass, is further preferably 30% to 100% by mass, and is further preferably 40% to 100% by mass of the total content of the monomers A1 (i.e., the total content of the monomer A1 the homopolymer of which has a Tg of 20° C. or more and the monomers A1 the homopolymers of which have a Tg of less than 20° C.).

In the case where at least one of the homopolymers of the monomers A1 has a glass transition temperature (Tg) of 20° C. or more, the content of the monomer A1 the homopolymer of which has a Tg of 20° C. or more is preferably 10% to 90% by mass, is more preferably 20% to 80% by mass, and is further preferably 25% to 70% by mass of the total amount of the ink.

The content of the monomers A1 is preferably 15% by mass or more, is more preferably 30% by mass or more, and is further preferably 40% by mass or more of the total amount of the ink.

The upper limit for the ratio of the content of the monomers A1 to the total amount of the ink is not set and may be, for example, 95% by mass or 90% by mass.

The proportion of the content of the monomers A1 to the total amount of all the photopolymerizable monomers included in the ink is preferably 20% by mass or more, is more preferably 30% by mass or more, and is further preferably 40% by mass or more.

The upper limit for the proportion of the content of the monomers A1 is not set and may be, for example, 100% by mass, 90% by mass, or 80% by mass.

Specific examples of the monomer A1 include the compounds described in Examples below.

The monomer A1 may be selected appropriately from the polymerizable monomers described in Paragraphs [0036] to [0051] in WO2015/133605A and Paragraphs [0097] to [0105] in WO2016/052053A.

The monomer A1 preferably includes at least one of 3,5,5-trimethylcyclohexyl acrylate or 4-t-butylcyclohexyl acrylate.

In such a case, the total content of 3,5,5-trimethylcyclohexyl acrylate and 4-t-butylcyclohexyl acrylate is preferably 10% to 100% by mass, is more preferably 20% to 100% by mass, is further preferably 30% to 100% by mass, and is further preferably 40% to 100% by mass of the total content of the monomers A1.

Monomer N1

In order to further improve the image in terms of graininess and adhesiveness, the photopolymerizable monomer included in the ink according to the present disclosure preferably includes at least one monomer N1 that is an N-vinyl compound.

The monomer N1 that is an N-vinyl compound is preferably an N-vinyl lactam compound, is more preferably N-vinylcaprolactam or N-vinylpyrrolidone, and is further preferably N-vinylcaprolactam.

In the case where the photopolymerizable monomer includes the monomer N1, the content of the monomer N1 is preferably 2% by mass or more, is more preferably 5% by mass or more, and is further preferably 10% by mass or more of the total amount of the ink in order to further improve the image in terms of graininess and adhesiveness.

The upper limit for the ratio of the content of the monomer N1 to the total amount of the ink is preferably 30% by mass or less and is more preferably 20% by mass or less in order to further enhance the adhesiveness of the image.

In the case where the photopolymerizable monomer includes the monomer N1, the mass ratio of the content of the monomer A1 to the content of the monomer N1 (hereinafter, also referred to as "mass ratio [Monomer A1/Monomer N1]") is preferably 2.0 to 15.0, is more preferably 2.0 to 10.0, is further preferably 2.0 to 7.0, and is further preferably 2.5 to 6.0.

When the mass ratio [Monomer A1/Monomer N1] is 2.0 or more, the adhesiveness of the image is further enhanced.

When the mass ratio [Monomer A1/Monomer N1] is 15.0 or less, the image is further improved in terms of graininess and adhesiveness.

Monomer A2

The photopolymerizable monomer may include at least one monomer A2 that is a monomer other than the monomer A1 or N1.

The monomer A2 is a photopolymerizable monomer other than the monomer N1 and has a surface tension of more than 31.0 mN/m.

The monomer A2 is not limited except for the above condition. The monomer A2 is preferably a (meth)acrylate compound and is more preferably an acrylate compound.

The monomer A2 is preferably a monofunctional, difunctional, trifunctional, or tetrafunctional monomer.

At least one monomer A2 preferably includes an alicyclic structure.

In such a case, the image is further improved in terms of graininess, glossiness, and adhesiveness.

In such a case, the photopolymerizable monomer may include a monomer A2 that includes an alicyclic structure and a monomer A2 that does not include an alicyclic structure.

In the case where the photopolymerizable monomer includes a monomer A2 that includes an alicyclic structure, the content of the monomer A2 that includes an alicyclic structure in the ink is preferably 1% to 40% by mass, is more preferably 3% to 30% by mass, is further preferably 5% to 25% by mass, and is further preferably 5% to 10% by mass of the total amount of the ink.

The monomer A2 that includes an alicyclic structure is preferably isobornyl (meth)acrylate, norbornyl (meth)acrylate, or adamantyl (meth)acrylate and is more preferably isobornyl (meth)acrylate.

Specific examples of the monomer A2 include the compounds described in Examples below.

The monomer A2 may be selected appropriately from the polymerizable monomers described in Paragraphs [0036] to [0051] in WO2015/133605A and Paragraphs [0097] to [0105] in WO2016/052053A.

Photopolymerization Initiator

The ink according to the present disclosure contains at least one photopolymerization initiator.

The photopolymerization initiator is preferably a radical polymerization initiator.

Examples of the radical polymerization initiator include:
  acetophenone polymerization initiators, such as diethoxyacetophenone, 2-hydroxy-2-methyl-1-phenylpropan-1-one, benzil dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-methyl-2-morpholino(4-thiomethylphenyl)propan-1-one, and 2-benzyl-2-dimethylamino-1-(4-morpholinophenyl)-butanone;

benzoin polymerization initiators, such as benzoin, benzoin methyl ether, and benzoin isopropyl ether;

acylphosphine oxide polymerization initiators, such as bis(2,4,6-trimethylbenzoyl)phenylphosphine oxide and 2,4,6-trimethylbenzoindiphenylphosphine oxide;

benzil glyoxylate ester; and methylphenyl glyoxylate ester.

The above specific examples are useful as a low-molecular-weight photopolymerization initiator.

Note that the term "low-molecular-weight photopolymerization initiator" used herein refers to a photopolymerization initiator having a molecular weight of less than 500.

In order to further improve the image in terms of graininess, glossiness, and adhesiveness, the ink according to the present disclosure preferably includes at least one high-molecular-weight photopolymerization initiator (preferably, a high-molecular-weight radical polymerization initiator).

The term "high-molecular-weight photopolymerization initiator" used herein refers to a photopolymerization initiator having a molecular weight of 500 or more.

The molecular weight of the high-molecular-weight photopolymerization initiator is preferably 500 to 3,000, is more preferably 700 to 2,500, and is further preferably 900 to 2,100.

Examples of the high-molecular-weight photopolymerization initiator include the compound represented by Formula (X) below. In Formula (X), n represents an integer of 1 to 30.

The compound represented by Formula (X) is described in, for example, JP2017-105902A (Paragraph [0038], etc.).

Commercial photopolymerization initiators may be used as a photopolymerization initiator.

Examples of the commercial initiators include

"Omnirad 819" produced by IGM Resins B.V. (commercial product of bis (2,4,6-trimethylbenzoyl)phenylphosphine oxide), "Omnirad TPO" produced by IGM Resins B.V. (commercial product of 2,4,6-trimethylbenzoyl diphenylphosphine oxide), and "Omnipol 910" produced by IGM Resins B.V. (commercial product of the compound represented by Formula (X)).

The high-molecular-weight photopolymerization initiator is preferably the compound represented by Formula (1) below (hereinafter, also referred to as "compound (1)") in order to further improve the image in terms of graininess, glossiness, and adhesiveness.

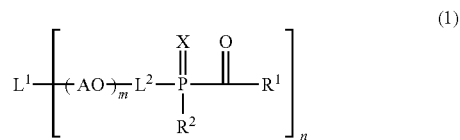

In Formula (1),

L¹ represents an organic group having 20 or less carbon atoms and a valence of n, n represents an integer of 3 to 8, AO represents an alkyleneoxy group having 2 or 3 carbon atoms, m represents an integer of 0 to 15, L² represents a single bond, an oxygen atom, a sulfur atom, or —NR¹¹—, R¹¹ represents a hydrogen atom or an alkyl group having 1 to 3 carbon atoms, X represents an oxygen atom or a sulfur atom, n R¹'s each independently represent a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, a 2,6-dichlorocyclohexyl

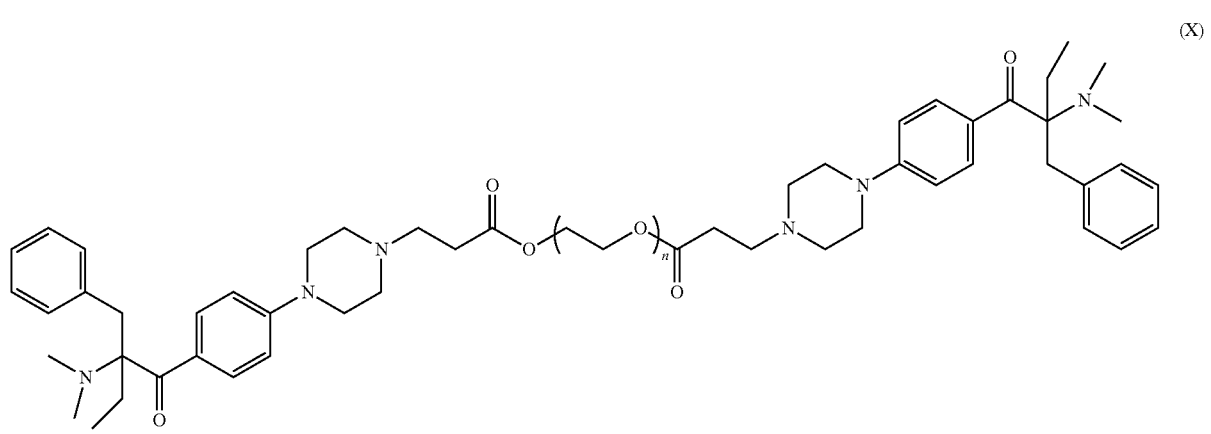

group, a tert-butyl group, a pentyl group, a hexyl group, a heptyl group, an octyl group, or a 2-ethylhexyl group, and n R²'s each independently represent R¹—(C=O)—, a methyl group, an ethyl group, a propyl group, an isopropyl group, an n-butyl group, a sec-butyl group, a tert-butyl group, a pentyl group, a hexyl group, a 2-ethylhexyl group, a phenyl group, a xylyl group, (i.e., a 2,3-dimethylphenyl group, a 2,4-dimethylphenyl group, a 2,5-dimethylphenyl group, a 2,6-dimethylphenyl group, a 3,4-dimethylphenyl group, or a 3,5-dimethylphenyl group), a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group.

In Formula (1), $L^1$ represents an organic group having 20 or less carbon atoms and a valence of n, and n represents an integer of 3 to 8.

Preferably, n is an integer of 3 to 6.

Examples of the organic group having 20 or less carbon atoms and a valence of n which is represented by $L^1$ include:
a hydrocarbon group (preferably a chain hydrocarbon group) having a valence of n;
a group formed by replacing at least one carbon atom included in a hydrocarbon group (preferably a chain hydrocarbon group) having a valence of n with a hetero atom (preferably an oxygen atom, a nitrogen atom, or a sulfur atom); and
a group formed by replacing at least one hydrogen atom included in a hydrocarbon group having a valence of n with a hydroxyl group, a thiol group, or an amino group.

The organic group having 20 or less carbon atoms and a valence of n which is represented by $L^1$ may include a ring structure but preferably does not include a ring structure.

The number of carbon atoms included in the organic group having 20 or less carbon atoms and a valence of n which is represented by $L^1$ is preferably 1 to 20, is more preferably 3 to 20, and is further preferably 3 to 10.

Specific examples of $L^1$ (i.e., the organic group having 20 or less carbon atoms and a valence of n) are described below. Note that $L^1$ is not limited to the following examples. In the specific examples below, the symbol * represents a bonding position.

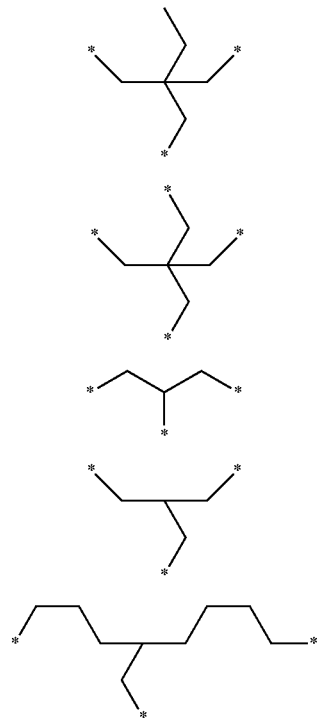

(L1-1)

(L1-2)

(L1-3)

(L1-4)

(L1-5)

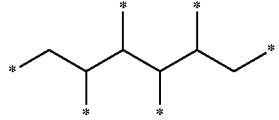

(L1-6)

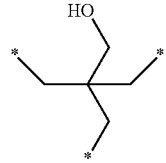

(L1-7)

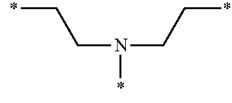

(L1-8)

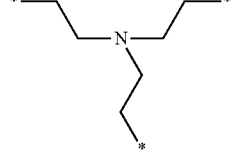

(L1-9)

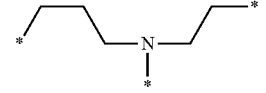

(L1-10)

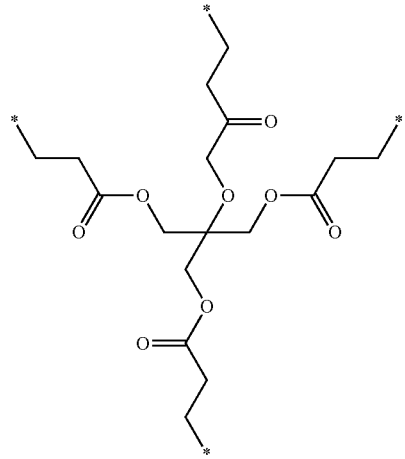

(L1-11)

In Formula (1), AO represents an alkyleneoxy group having 2 or 3 carbon atoms, and m represents an integer of 0 to 15.

In Formula (1), when m is 0, $L^1$ and $L^2$ are directly bonded to each other. In such a case, when $L^2$ is a single bond, $L^1$ and P (phosphorus atom) are directly bonded to each other.

In Formula (1), m represents an integer of 0 to 15.

In Formula (1), m is preferably an integer of 0 to 10, is more preferably an integer of 0 to 5, is further preferably an integer of 0 to 3, and is further preferably 0 or 1.

In Formula (1), $L^2$ represents a single bond, an oxygen atom (i.e., —O—), a sulfur atom (i.e., —S—), or —$NR^{11}$—, and $R^{11}$ represents a hydrogen atom or an alkyl group having 1 to 3 carbon atoms.

$R^{11}$ is preferably a hydrogen atom, a methyl group, or an ethyl group, is more preferably a hydrogen atom or a methyl group, and is further preferably a hydrogen atom.

$L^2$ is preferably an oxygen atom or a sulfur atom.

In Formula (1), X represents an oxygen atom (i.e., =O) or a sulfur atom (i.e., =S).

X is preferably an oxygen atom.

In Formula (1), n $R^1$'s each independently represent a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, a 2,6-dichlorocyclohexyl group, a tert-butyl group, a pentyl group, a hexyl group, a heptyl group, an octyl group, or a 2-ethylhexyl group.

In Formula (1), n $R^1$'s preferably each independently represent
- a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, a 2,6-dinitrophenyl group, a 2,6-dimethylcyclohexyl group, a 2,6-diethylcyclohexyl group, a 2,6-dimethoxycyclohexyl group, a 2,6-diethoxycyclohexyl group, or a 2,6-dichlorocyclohexyl group;
- more preferably a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, a 2,6-diethoxyphenyl group, an α-naphthyl group, or a 2,6-dinitrophenyl group;
- further preferably a phenyl group, a 2,6-dichlorophenyl group, a 2,4,6-trichlorophenyl group, a 2,6-dimethylphenyl group, a 2,4,6-trimethylphenyl group, a 2,6-diethylphenyl group, a 2,6-dimethoxyphenyl group, or a 2,6-diethoxyphenyl group; and
- further preferably a phenyl group, a 2,6-dimethylphenyl group, a 2,4,6-trimethylphenyl group, or a 2,6-diethylphenyl group.

In Formula (1), n $R^2$'s each independently represent $R^1$—(C=O)—, a methyl group, an ethyl group, a propyl group, an isopropyl group, an n-butyl group, a sec-butyl group, a tert-butyl group, a pentyl group, a hexyl group, a 2-ethylhexyl group, a phenyl group, a xylyl group (i.e., a 2,3-dimethylphenyl group, a 2,4-dimethylphenyl group, a 2,5-dimethylphenyl group, a 2,6-dimethylphenyl group, a 3,4-dimethylphenyl group, or a 3,5-dimethylphenyl group), a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group.

Note that $R^1$ in $R^1$—(C=O)— has the same meaning as $R^1$ in Formula (1) above. Preferable examples of $R^1$ in $R^1$—(C=O)— are also the same as those of $R^1$ in Formula (1). $R^1$ in $R^1$—(C=O)— may be identical to or different from $R^1$ in Formula (1).

In Formula (1), n $R^2$'s preferably each independently represent
- a phenyl group, a xylyl group, a 4-biphenyl group, a 2-chlorophenyl group, a 3-chlorophenyl group, a 4-chlorophenyl group, a 2,4-dichlorophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2,4-dimethoxyphenyl group, a 2-ethoxyphenyl group, a 3-ethoxyphenyl group, a 4-ethoxyphenyl group, an α-naphthyl group, a methylnaphthyl group, a chloronaphthyl group, an ethoxynaphthyl group, a 2-nitrophenyl group, or a 4-nitrophenyl group; and
- further preferably a phenyl group, a xylyl group, a 2-methylphenyl group, a 3-methylphenyl group, a 4-methylphenyl group, a 2-ethylphenyl group, a 3-ethylphenyl group, or a 4-ethylphenyl group.

The molecular weight of the compound represented by Formula (1) is preferably 500 or more, is more preferably 500 to 3,000, is further preferably 700 to 2,500, and is further preferably 900 to 2,100.

Specific examples (P initiators 1 to 17) of the compound represented by Formula (1) are described below. Note that the compound represented by Formula (1) is not limited to the following specific examples.

The specific examples are described together with the respective molecular weights (Mw).

P initiator 1

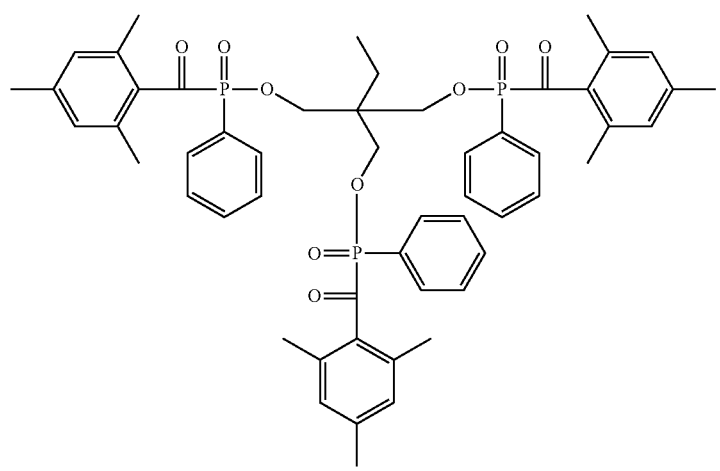

Mw944

-continued
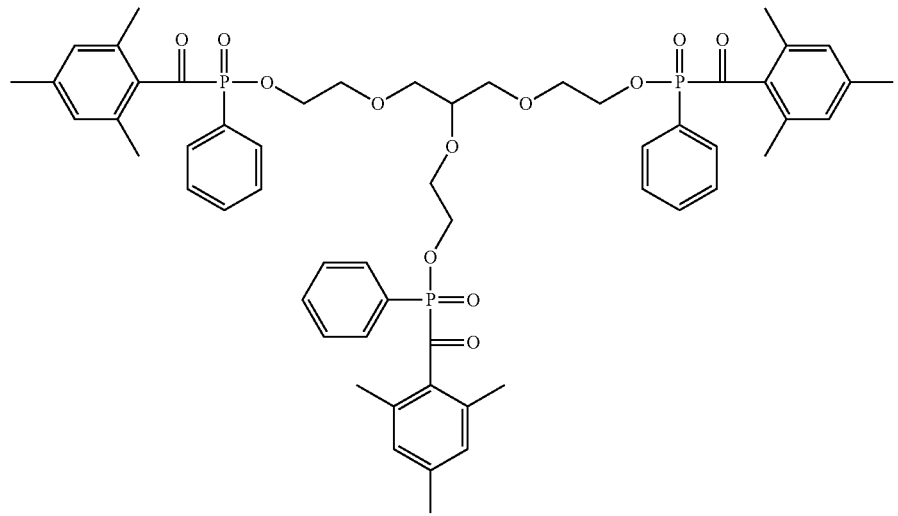
P initiator 2
Mw1035
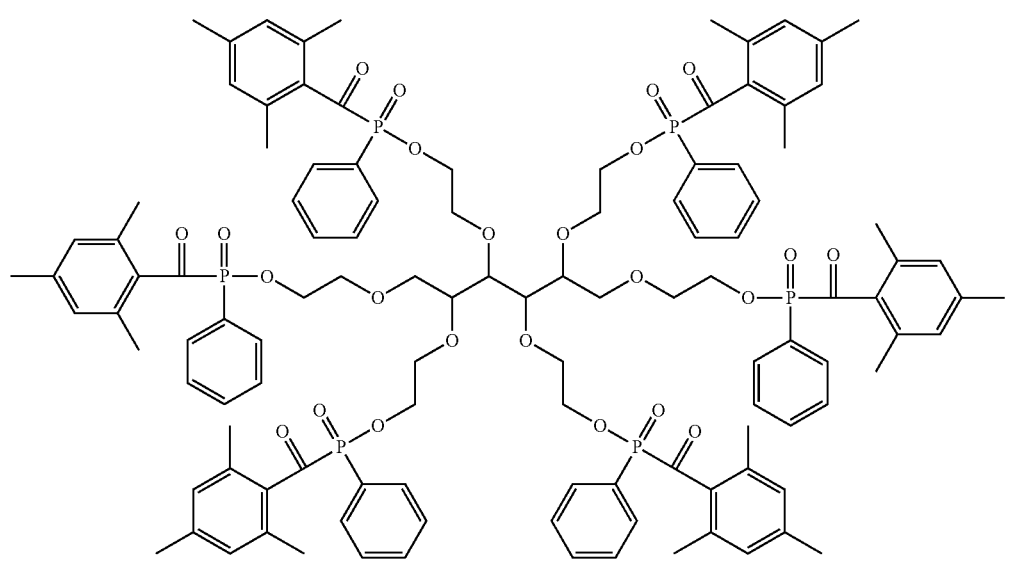
P initiator 3
Mw2068

-continued
P initiator 4
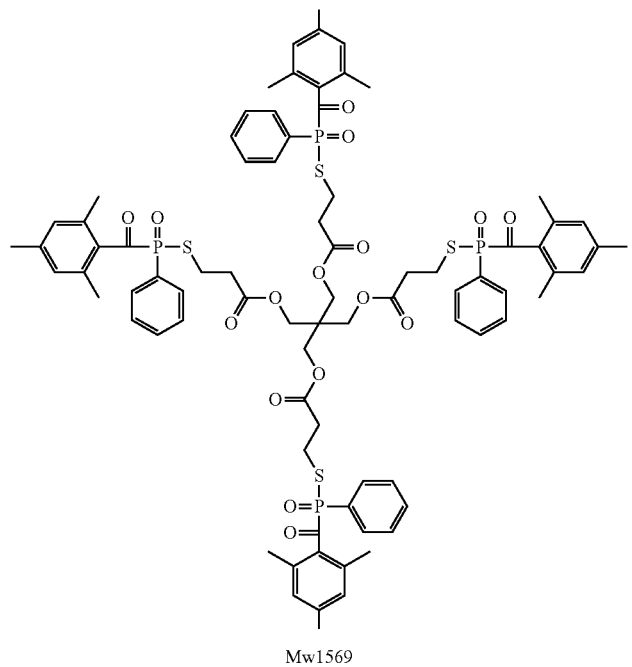
Mw1569
P initiator 5
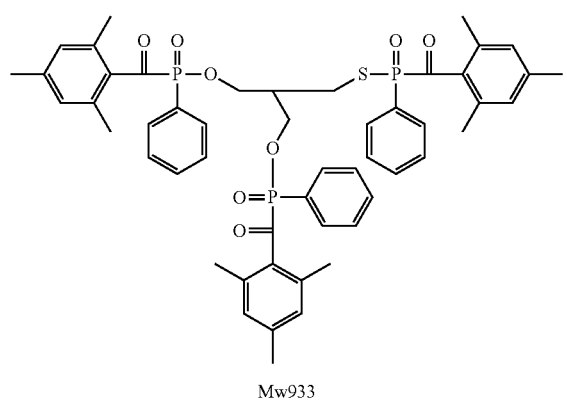
Mw933
P initiator 6
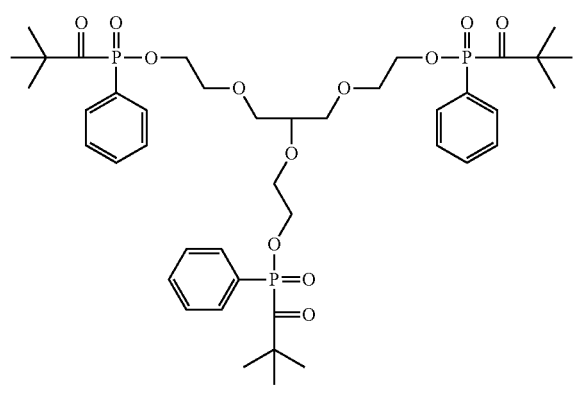
Mw849
P initiator 7
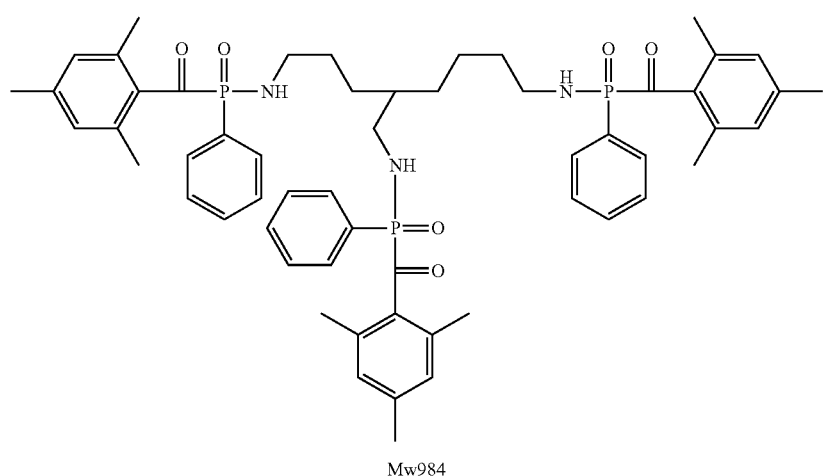
Mw984

-continued
P initiator 8
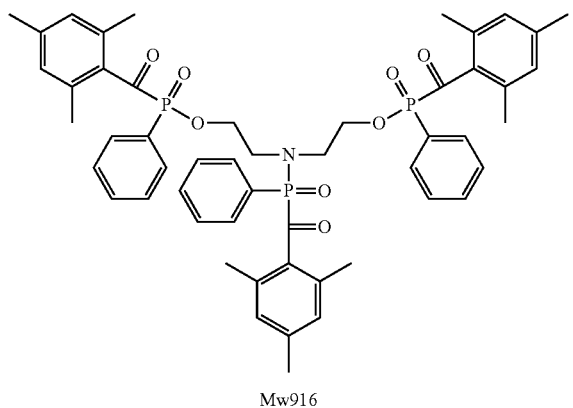
Mw916
P initiator 9
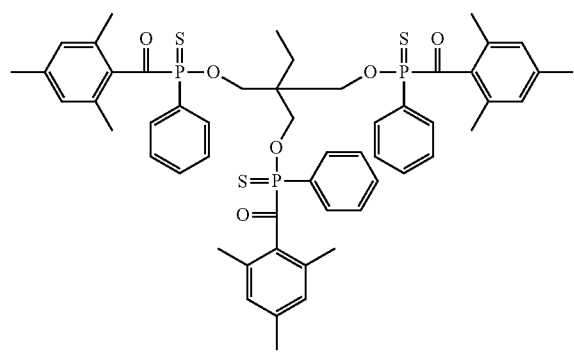
Mw993
P initiator 10
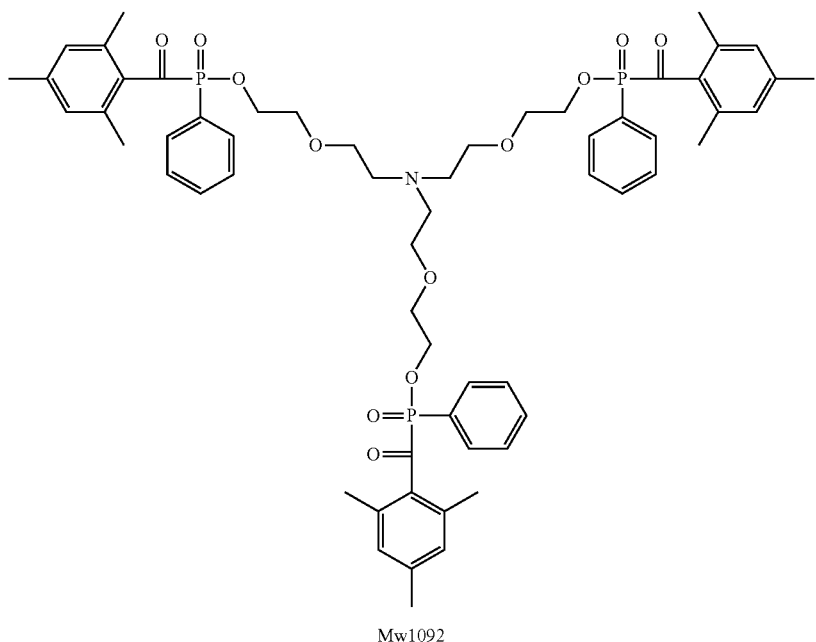
Mw1092

-continued
P initiator 11
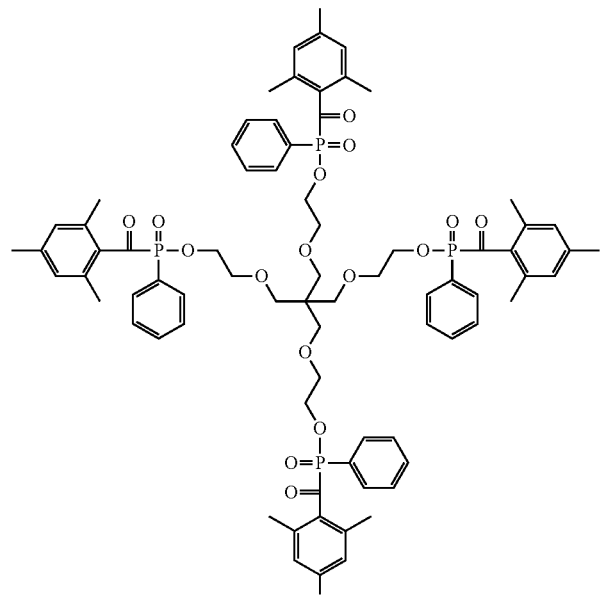
Mw1393
P initiator 12
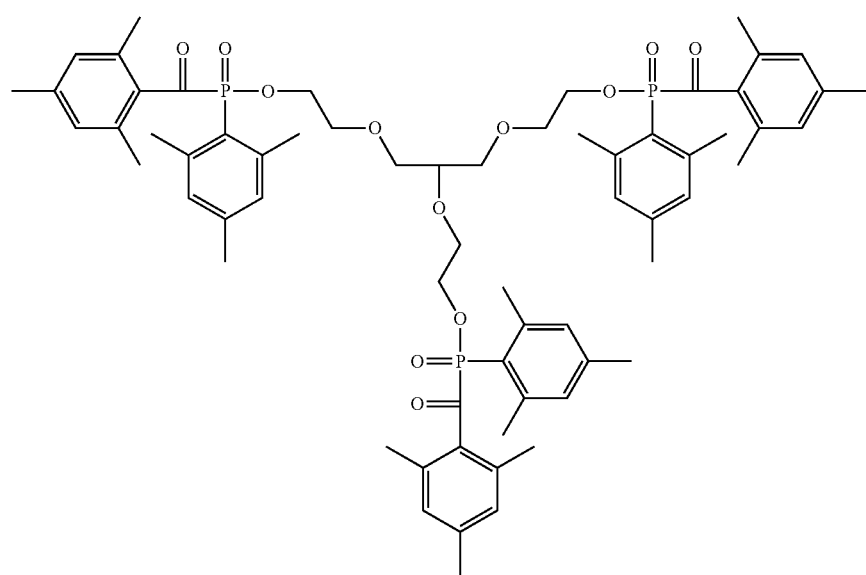
Mw1161

P initiator 13
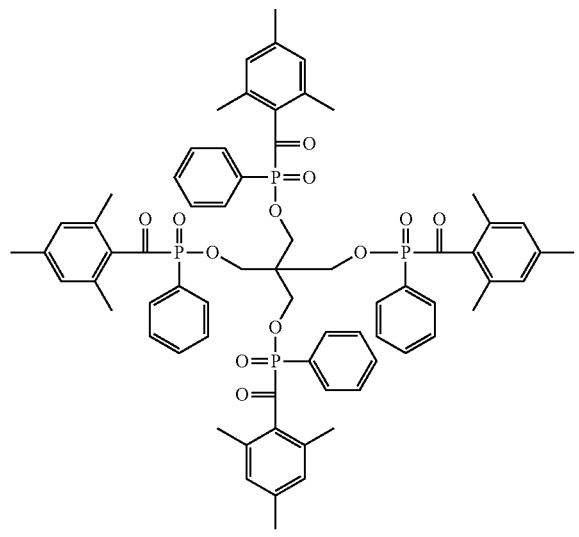
Mw1217
P initiator 14
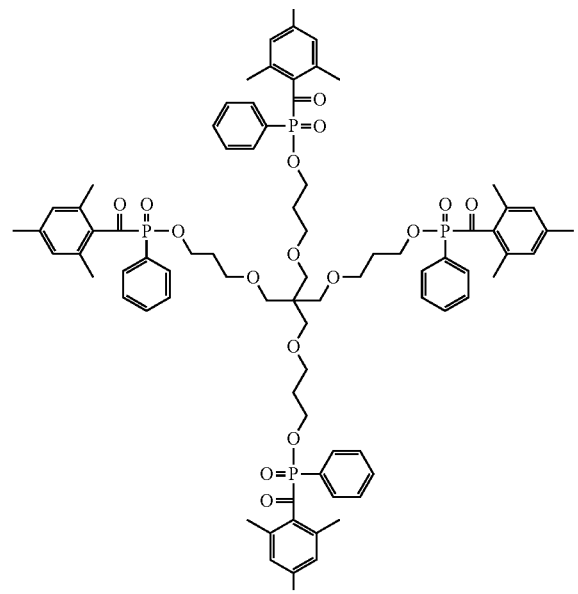
Mw1450
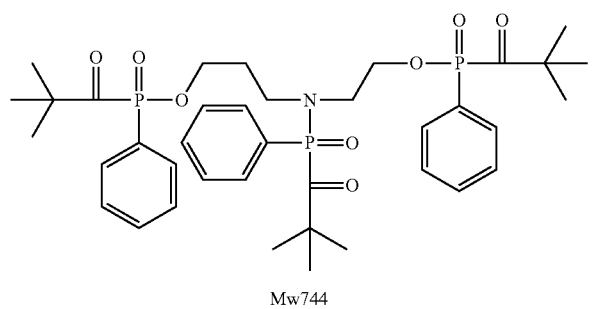
Mw744
P initiator 15
P initiator 16
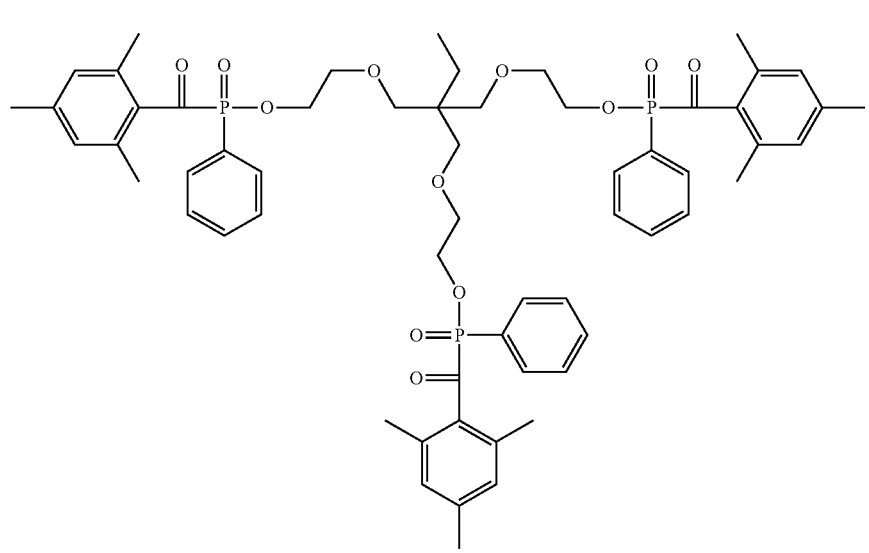
Mw1077

-continued

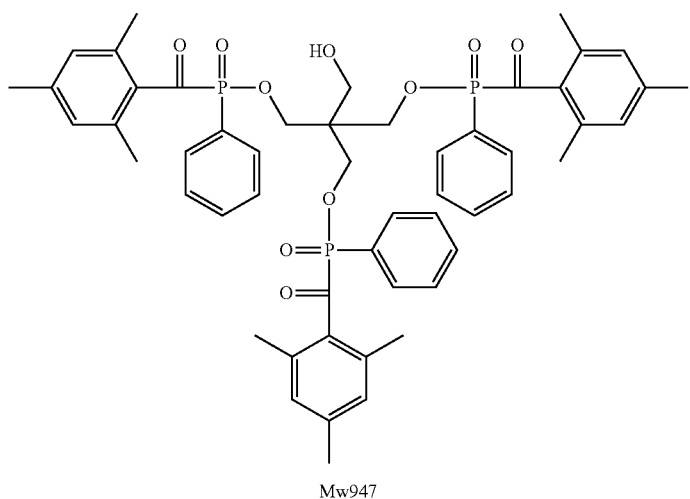

Mw947

P initiator 17

The compound (1) (i.e., the compound represented by Formula (1)) can be synthesized using the compound (1-M1) or (1-M2) below as a starting material.

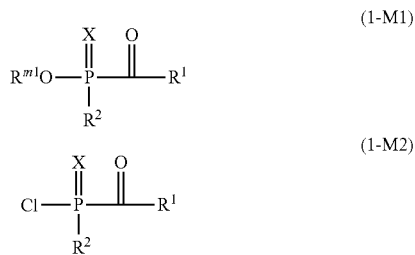

In the compounds (1-M1) and (1-M2), $R^1$, $R^2$, and X have the same meaning as $R^1$, $R^2$, and X in Formula (1). Preferable examples of $R^1$, $R^2$, and X in the compounds (1-M1) and (1-M2) are also the same as those of $R^1$, $R^2$, and X in Formula (1).

In compound (1-M1), $R^{m1}$ represents a hydrogen atom or an alkyl group.

The compound (1-M2) can be synthesized using the compound (1-M1) as a starting material by a common method known in the related art.

Examples of the known method for synthesizing the compound (1-M2) using the compound (1-M1) as a starting material include:
 a method in which the compound (1-M1) is reacted with thionyl chloride ($SOCl_2$) in the presence of pyridine; and
 a method in which the compound (1-M1) is reacted with $PCl_5$.

The method for synthesizing the compound (1) using the compound (1-M1) or (1-M2) as a starting material is also known in the related art. Examples of the known synthesis method include:
 a method in which the compound (1-M1) or (1-M2) is reacted with
 a polyol compound including 3 to 8 hydroxyl groups, a polythiol compound including 3 to 8 thiol groups (—SH), or an amine compound including 1 to 8 amino groups (—$NR_2$; two R's each independently represent a hydrogen atom or an alkyl group having 1 to 3 carbon atoms).

In this method, the types of the polyol, polythiol, and amine compounds can be selected appropriately in accordance with the structure of the compound (1) that is to be synthesized.

Preferable examples of the compound (1) and preferable methods for producing the compound (1) are described, for example, in Paragraphs [0017] to [0053] in JP2017-522364A.

The content of the compound (1) in the ink according to the present disclosure is preferably 0.5% to 25% by mass, is more preferably 1% to 20% by mass, is further preferably 2% to 15% by mass, and is further preferably 4% to 15% by mass of the total amount of the ink in order to further enhance the adhesiveness of the image.

The proportion of the compound (1) to the total amount of the photopolymerization initiator included in the ink according to the present disclosure is preferably 50% to 100% by mass, is more preferably 70% to 100% by mass, and is further preferably 80% to 100% by mass.

The content of the photopolymerization initiator in the ink according to the present disclosure is preferably 1% to 20% by mass, is more preferably 2% to 20% by mass, and is further preferably 3% to 15% by mass of the total amount of the ink.

Sensitizer

The ink according to the present disclosure preferably includes at least one sensitizer in order to further improve the image in terms of graininess, glossiness, and adhesiveness.

Examples of the sensitizer include:
 benzophenone sensitizers, such as benzophenone, methyl o-benzoylbenzoate-4-phenylbenzophenone, 4,4'-dichlorobenzophenone, hydroxybenzophenone, 4-benzoyl-4'-methyl-diphenyl sulfide, benzophenone acrylate, 3,3',4,4'-tetra(t-butylperoxycarbonyl) benzophenone, and 3,3'-dimethyl-4-methoxybenzophenone; and
 thioxanthone sensitizers, such as thioxanthone, 2-isopropylthioxanthone, 2-chlorothioxanthone, 2,4-dichlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(methoxyethoxycarbonyl)thioxanthone, 4-butoxycarbonylthioxanthone, 3-butoxycarbonyl-7-methylthioxanthone, 1-cyclo-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfuryl-thioxanthone, 3,4-di[2-(methoxyethoxy)ethoxycarbonyl)]thioxanthone], 1-ethoxycarbonyl-3-(1-methyl-1-morpholinoethyl)thioxanthone], 2-methyl-6-dimethoxymethylthioxanthone, 2-methyl-6-(1,1-dimethoxybenzyl)thioxanthone, 2-morpholinomethylthioxanthone, 2-methyl-6-morpholinomethyl-thioxanthone, N-allylthioxanthone-3,4-dicarboxyimide, N-octylthioxanthone-3,4-dicarboxyimide, N-(1,1,3,3-tetramethylbutyl)-thioxanthone-3,4-dicarboxyimide, 1-phenoxythioxanthone, 6-ethoxycarbonyl-1-2-methoxythioxanthone, 6-ethoxycarbonyl-2-methylthi-oxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride, n-dodecyl-7-methyl-thioxanthone-3-carboxylate, and N,N-diisobutyl-7-methyl-thioxanthone-3-carbamide.

The above specific examples are useful as a low-molecular-weight sensitizer.

The term "low-molecular-weight sensitizer" used herein refers to a sensitizer having a molecular weight of less than 500.

The ink according to the present disclosure may include a high-molecular-weight sensitizer in order to further improve the image in terms of graininess, glossiness, and adhesiveness.

The term "high-molecular-weight sensitizer" used herein refers to a sensitizer having a molecular weight of 500 to 5,000.

The molecular weight of the high-molecular-weight sensitizer is preferably 500 to 3,000, is more preferably 800 to 2,500, and is further preferably 900 to 2,100.

Examples of the high-molecular-weight sensitizer include the compounds represented by Formulae (S1) and (S2) below.

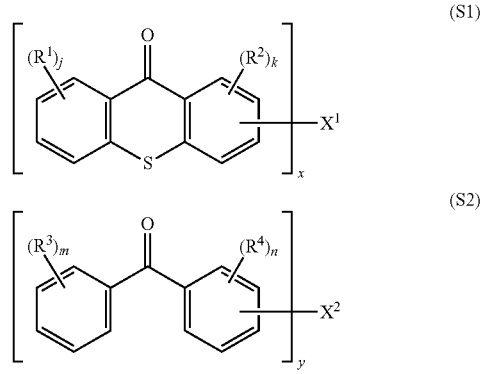

In Formulae (S1) and (S2), $R^1$, $R^2$, $R^3$, and $R^4$ each independently represent an alkyl group having 1 to 5 carbon atoms or a halogen atom; x and y each independently represent an integer of 2 to 4; j and m each independently represent an integer of 0 to 4; k and n each independently represent an integer of 0 to 3; when j, k, m, and n are integers of 2 or more, a plurality of $R^1$'s, a plurality of $R^2$'s, a plurality of $R^3$'s, and a plurality of $R^4$'s may be identical to or different from one another; $X^1$ represents a linking group that has a valence of x and includes at least one of a hydrocarbon chain, an ether linkage, or an ester linkage; and $X^2$ represents a linking group that has a valence of y and includes at least one of a hydrocarbon chain, an ether linkage, or an ester linkage.

Preferable examples and specific examples of the compound represented by Formula (S1) are described in Paragraphs [0035] to [0053] in JP2014-162828A.

Commercial compounds may be used as a compound represented by Formula (S1). Specific examples thereof include "Speedcure (registered trademark) 7010" produced by Lambson (1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)]oxymethyl)propane, CAS No. 1003567-83-6);

"OMNIPOL (registered trademark) TX" produced by IGM Resins B.V. (polybutyleneglycol bis(9-oxo-9H-thio-xanthenyloxy)acetate, CAS No. 813452-37-8); and "Genopo TX-2" produced by Ran A.G.

Preferable examples and specific examples of the compound represented by Formula (S2) are described in Paragraphs [0054] to [0075] in JP2014-162828A.

Commercial compounds may be used as a compound represented by Formula (S2).

Specific examples thereof include "OMNIPOL BP" produced by IGM Resins B.V. (polybutyleneglycol bis(4-benzoylphenoxy)acetate, CAS No. 515136-48-8).

In the case where the ink according to the present disclosure includes the sensitizer, the content of the sensitizer is preferably 0.1% to 15% by mass, is more preferably 0.5% to 10% by mass, and is further preferably 1% to 5% by mass of the total amount of the ink.

Colorant

The ink according to the present disclosure includes at least one colorant.

Therefore, the ink according to the present disclosure can be suitably used as a coloring ink (e.g., a cyan ink, a magenta ink, a yellow ink, a black ink, or a white ink).

The type of the colorant is not limited; common colorants known in the related art, such as a pigment and a dye, may be selected and used appropriately. Among the above colorants, a pigment is more preferably used because it has excellent weather resistance and is rich in color reproducibility.

The type of the pigment is not limited and may be selected appropriately in accordance with the intended application. Examples of the pigment include common organic and inorganic pigments known in the related art.

Examples of the pigment also include resin particles colored with a dye, a commercial pigment dispersion, and a surface-treated pigment (e.g., a pigment dispersion prepared by dispersing a pigment in a dispersion medium (e.g., a radical photopolymerizable monomer or an organic solvent); and a surface-treated pigment prepared by treating the surface of a pigment with a resin, a pigment derivative, or the like).

Examples of the organic and inorganic pigments include a yellow pigment, a red pigment, a magenta pigment, a blue pigment, a cyan pigment, a green pigment, an orange pigment, a purple pigment, a brown pigment, a black pigment, and a white pigment.

In the case where the ink according to the present disclosure includes a pigment as a colorant, the ink according to the present disclosure may further include a pigment dispersing agent.

For pigments and pigment dispersing agents, documents known in the related art, such as Paragraphs [0060] to [0074] in WO2015/133605A, Paragraphs [0152] to [0158] in JP2011-225848A, and Paragraphs [0132] to [0149] in JP2009-209352A, may be referred as needed.

The content of the colorant is preferably 1% to 20% by mass and is more preferably 2% to 10% by mass of the total amount of the ink.

Gelling Agent

The ink according to the present disclosure may include at least one gelling agent.

Examples of the gelling agent include the gelling agents described in Paragraphs [0018] to [0032] in WO2015/133605A.

The gelling agent is preferably at least one selected from the group consisting of an aliphatic ester, an aliphatic ketone, a petroleum-derived wax, a vegetable wax, an animal wax, a mineral wax, a hydrogenated castor oil derivative, a polyethylene wax derivative, a fatty acid having 12 or more (preferably, 12 to 25) carbon atoms, an alcohol having 12 or more (preferably, 12 to 25) carbon atoms, hydroxystearic acid, fatty acid amide, N-substituted fatty acid amide, and an amine having 12 or more (preferably, 12 to 25) carbon atoms.

The aliphatic ester is preferably the aliphatic ester represented by Formula (G1) below.

The aliphatic ketone is preferably the aliphatic ketone represented by Formula (G2) below.

$R^1\text{—COO—}R^2$              Formula (G1)

$R^3\text{—CO—}R^4$              Formula (G2)

In Formulae (G1) and (G2), $R^1$ to $R^4$ each independently represent an alkyl group including a linear portion having 12 or more carbon atoms.

The alkyl groups represented by $R^1$ to $R^4$ may include a branch portion.

The number of the carbon atoms included in the linear portion of each of the alkyl groups represented by $R^1$ to $R^4$ is preferably 12 to 26.

Examples of the petroleum-derived wax include a paraffin wax, a microcrystalline wax, and petrolatum.

Examples of the vegetable wax include a candelilla wax, carnauba wax, a rice bran wax, a Japan wax, a jojoba oil, a jojoba solid wax, and a jojoba ester.

Examples of the animal wax include a beeswax, lanoline, and spermaceti.

Examples of the mineral wax include a montan wax and a hydrogenated wax.

Examples of the fatty acid having 12 or more carbon atoms include behenic acid, arachidic acid, stearic acid, palmitic acid, myristic acid, lauric acid, oleic acid, and erucic acid.

Examples of the alcohol having 12 or more carbon atoms include stearyl alcohol and behenyl alcohol.

Examples of the fatty acid amide include lauramide, stearamide, behenamide, oleamide, erucamide, ricinoleamide, and 12-hydroxystearamide.

Examples of the N-substituted fatty acid amide include N-stearyl stearamide and N-oleyl palmitamide.

Examples of the amine having 12 or more carbon atoms include dodecylamine, tetradecylamine, and octadecylamine.

The melting point of the gelling agent is preferably 40° C. to 90° C., is more preferably 50° C. to 80° C., and is further preferably 60° C. to 80° C.

In the case where the ink according to the present disclosure includes the gelling agent, the content of the gelling agent is preferably 0.1% to 5.0% by mass, is more preferably 0.1% to 4.0% by mass, and is further preferably 0.5% to 2.5% by mass of the total amount of the ink.

Surfactant

The content of a surfactant in the ink according to the present disclosure is 0.01% by mass or less of the total amount of the ink.

The ink according to the present disclosure does not necessarily include a surfactant. In other words, the content of the surfactant may be 0% by mass.

As described above, the average surface tension of the photopolymerizable monomers included in the ink according to the present disclosure is limited to 31.0 mN/m or less. Therefore, although the content of the surfactant in the ink according to the present disclosure is limited to 0.01% by mass or less, an image excellent in terms of graininess and glossiness can be recorded.

When the content of the surfactant in the ink according to the present disclosure is 0.01% by mass or less, the following advantages are gained.

Specifically, in the case where an ink film is formed on a recording medium using, for example, the ink according to the present disclosure as an ink of the first color, the ink film is irradiated with an active energy ray, and at least one subsequent ink is applied onto the ink film to record a secondary or higher color image (e.g., a secondary color image), the secondary or higher color image can be improved in terms of graininess and glossiness.

This is presumably because limiting the content of the surfactant to 0.01% by mass or less reduces the likelihood of the surfactant bleeding on the surface of the ink film when the ink film is irradiated with an active energy ray. The reduction in the likelihood of the surfactant bleeding on the surface of the ink film results in a reduction in the likelihood of the subsequent ink applied onto the ink film being repelled by the ink film and consequently enables a secondary or higher color image excellent in terms of graininess and glossiness to be formed.

In the above case, "subsequent ink" may be either an active energy ray-curable ink that corresponds to the ink according to the present disclosure or an active energy ray-curable ink that does not correspond to the ink according to the present disclosure.

The content of the surfactant in the ink according to the present disclosure is preferably 0.0001% by mass or less of the total amount of the ink in order to further improve the secondary or higher color image in terms of graininess and glossiness.

Organic Solvent

The ink according to the present disclosure may contain a trace amount of organic solvent such that the above-described advantageous effects are not impaired.

However, it is preferable that the ink according to the present disclosure do not include an organic solvent or, when the ink includes an organic solvent, the content of the organic solvent be reduced in order to further reduce the impact on recording media.

In order to further reduce the impact on recording media, the content of the organic solvent in the ink is preferably less than 5% by mass, is more preferably less than 3% by mass, and is further preferably less than 1% by mass of the total amount of the ink.

Water

The ink according to the present disclosure may include a trace amount of water such that the above-described advantageous effects are not impaired.

However, it is preferable that the ink according to the present disclosure do not include water or, when the ink includes water, the content of water be reduced in order to achieve the above-described advantageous effects more effectively.

The content of water in the ink is preferably less than 5% by mass, is more preferably less than 3% by mass, and is further preferably less than 1% by mass of the total amount of the ink.

Other Constituents

The ink according to the present disclosure may include constituents other than the above-described constituents.

Examples of the other constituents include a sensitizer assistant, a matting agent, an ultraviolet absorber, an infrared absorber, an antimicrobial agent, a basic compound (e.g., a basic alkali-metal compound, a basic alkaline-earth metal compound, or a basic organic compound (e.g., an amine)), and a resin (e.g., a polyester resin, a polyurethane resin, a vinyl resin, an acrylic resin, or a rubber resin).

Ink Jet Ink

The ink according to the present disclosure is preferably an ink jet ink.

In the case where the ink according to the present disclosure is used as an ink jet ink, the preferable physical properties of the ink are as described below.

The surface tension of the ink according to the present disclosure (i.e., the surface tension at 25° C.) is preferably 20 to 50 mN/m and is more preferably 28 to 50 mN/m.

When the surface tension of the ink is 20 mN/m or more, ink discharge performance is further enhanced.

When the surface tension of the ink is 50 mN/m or less, the glossiness of the image is further enhanced.

The viscosity of the ink according to the present disclosure at 25° C. is preferably 10 to 50 mPa·s, is more preferably 10 to 30 mPa·s. and is further preferably 10 to 25 mPa·s. The viscosity of the ink can be adjusted by, for example, changing the compositional ratio of the constituents of the ink.

The term "viscosity" used herein refers to a viscosity measured with a viscometer. Examples of the viscometer include "VISCOMETER RE-85L" produced by Toki Sangyo Co., Ltd.

When the viscosity of the ink falls within the above preferable range, discharge stability can be further enhanced.

Image Recording Method

An image recording method according to the present disclosure includes a step of applying the ink according to the present disclosure onto a recording medium to form an ink film (hereinafter, also referred to as "first application step"), and a step of irradiating the ink film with an active energy ray (hereinafter, also referred to as "first irradiation step").

The image recording method according to the present disclosure may further include other steps as needed.

As described above, in the image recording method according to the present disclosure, the ink according to the present disclosure is used. Therefore, the image recording method according to the present disclosure produces the same advantageous effects as the ink according to the present disclosure.

Recording Medium

A recording medium used in the image recording method according to the present disclosure is not limited.

Examples of the recording medium include a paper sheet; a paper sheet laminated with a plastic (e.g., polyethylene, polypropylene, or polystyrene); a metal sheet (e.g., a sheet made of a metal such as aluminum, zinc, or copper); a plastic film (e.g., a film made of a plastic such as a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, or an acrylic resin); a paper sheet on which a film made of any of the above metals is formed by lamination or vapor deposition; and a plastic film on which a film made of any of the above metals is formed by lamination or vapor deposition.

First Application Step

In the first application step, the ink according to the present disclosure is applied onto the recording medium to form an ink film.

Examples of the method for application of the ink include common application methods known in the related art, such as a coating method, an ink jet method, and a dipping method.

An ink jet method is preferable as a method for application of the ink. In other words, the ink according to the present disclosure is preferably an ink jet ink.

An ink jet method is advantageous in that it does not require a printing plate and is capable of ejecting required amounts of ink droplets to intended positions on the basis of only a digital image.

For applying the ink to a recording medium by an ink jet method, a common application method known in the related art in which the ink is discharged from nozzles (i.e., discharge holes) of an ink jet head and applied onto a recording medium is applicable and can be performed with an ink jet recording apparatus.

The type of the ink jet recording apparatus is not limited. A common ink jet recording apparatus known in the related art which is capable of achieving the intended resolution may be selected and used appropriately. That is, common ink jet recording apparatuses known in the related art, which include commercial ink jet recording apparatuses, may be used.

Examples of the ink jet recording apparatus include an ink jet recording apparatus that includes an ink feed system, a temperature sensor, and a heating unit.

The ink feed system is constituted by, for example, a source tank that accommodates an ink, a feed pipe, an ink feed tank disposed immediately before an ink jet head, a filter, and a piezoelectric ink jet head. The piezoelectric ink jet head can be driven to discharge multi-size dots preferably having a volume of 1 to 100 pL and more preferably having a volume of 1 to 60 pL preferably at a resolution of 320 dpi (dots per inch)×320 dpi to 4,000 dpi×4,000 dpi (dots per inch), more preferably at 400 dpi×400 dpi to 1,600 dpi×1,600 dpi, and further preferably at 720 dpi×720 dpi to 1,600 dpi×1,600 dpi.

Note that "dpi" refers to the number of dots per inch (2.54 cm).

The volume of one droplet discharged from each of the nozzles of the ink jet head varies depending on the intended image resolution and is preferably 0.5 to 10 pL and more preferably 0.5 to 2.5 pL in order to form a high-definition image.

The ink application system used in the ink jet method may be either a single pass system or a scan system and is preferably a single pass system in consideration of the speed at which an image is recorded.

Note that a single pass system is a system in which a line head including nozzles arranged to cover the entirety of a side of a recording medium is used as an ink jet head and fixed in position and, while the recording medium is transported in a direction perpendicular to the direction in which the nozzles of the line head are arranged, an ink is applied onto the recording medium.

A scan system is a system in which a short serial head is used as an ink jet head and an ink is applied onto a recording medium while the short serial head is scanned across the recording medium.

The speed at which the recording medium is transported is preferably 1 to 120 m/s and is more preferably 50 m/s to 120 m/min.

Note that the preferable range of the speed at which a recording medium is transported in the second or later step is the same as the preferable range of the speed at which a recording medium is transported in the first step.

In the image recording method according to the present disclosure, the speed at which a recording medium is transported may be constant throughout all the steps or may be changed in at least some of the steps.

First Irradiation Step

In the first irradiation step, the ink film formed in the first application step is irradiated with an active energy ray.

In the first irradiation step, the irradiation of the ink film with an active energy ray causes at least a part of the photopolymerizable monomers included in the ink film to polymerize and thereby forms an image.

In the case where only a part of the photopolymerizable monomers included in the ink film is polymerized in the first irradiation step, the amount of irradiation energy of the active energy ray is reduced compared with the case where substantially the entirety of the photopolymerizable monomers included in the ink film is polymerized.

In the present disclosure, polymerizing only a part of the photopolymerizable monomers included in the ink film is also referred to as "partial curing", and irradiating the ink film with an active energy ray to perform partial curing is also referred to as "pinning exposure".

In the present disclosure, polymerizing substantially the entirety of the photopolymerizable monomers included in the ink film is also referred to as "full curing", and irradiating the ink film with an active energy ray to perform full curing is also referred to as "full exposure".

The first irradiation step may be
a step of performing pinning exposure (i.e., partial curing) of the ink film,
a step of performing full exposure (i.e., full curing) of the ink film, or
a step of performing pinning exposure of the ink film and subsequently performing full exposure of the ink film.

In the case where the first irradiation step is a step of performing pinning exposure (i.e., partial curing) of the ink film, an image that is a partially cured ink film is formed in the first irradiation step.

In the case where the first irradiation step is a step of performing full exposure (i.e., full curing) of the ink film or a step of performing pinning exposure and full exposure of the ink film in this order, an image that is a fully cured ink film is formed in the first irradiation step.

In the case where the first irradiation step is a step of performing pinning exposure (i.e., partial curing) of the ink film, the image recording method preferably includes the second application step and second irradiation step described below.

The reaction rate of the ink film subsequent to the pinning exposure (i.e., partial curing) is preferably 10% to 80%.

Note that the term "reaction rate" of the ink film used herein refers to the rate of polymerization of the photopolymerizable monomers included in the ink film which is determined by high-performance liquid chromatography.

When the reaction rate of the ink film is 10% or more, the possibility of dots of the ink that is to be applied onto the ink film (e.g., the second ink described below) failing to spread to a sufficient degree is reduced and, consequently, the final image (e.g., the secondary or higher color image described below) is improved in terms of graininess and glossiness.

When the reaction rate of the ink film is 80% or less, the possibility of dots of the ink that is to be applied onto the ink film (e.g., the second ink described below) spreading to an excessive degree is reduced and the droplet interference between the ink dots is reduced. This enhances the glossiness and quality of the final image.

The reaction rate of the ink film is preferably 15% or more in order to further improve the final image in terms of graininess and glossiness.

The reaction rate of the ink film is preferably 75% or less, is more preferably 50% or less, is preferably 40% or less, is more preferably 30% or less, and is further preferably 25% or less in order to further enhance the glossiness and quality of the final image.

The reaction rate of the ink film subsequent to the full exposure (i.e., full curing) is preferably more than 80% and 100% or less, is more preferably 85% to 100%, and is further preferably 90% to 100%.

When the above reaction rate is more than 80%, the adhesiveness of the image is further enhanced.

The reaction rate of the ink film is determined by the following method.

A recording medium having an ink film formed thereon and irradiated with an active energy ray is prepared. A sample piece having a size of 20 mm×50 mm is taken from a region of the recording medium in which the ink film is present (hereinafter, referred to as "irradiated sample piece"). The irradiated sample piece is immersed in 10 mL of tetrahydrofuran (THF) for 24 hours in order to prepare a solution containing an eluted ink. This solution is subjected to high-performance liquid chromatography in order to measure the amount of photopolymerizable monomers (hereinafter, referred to as "amount of monomers X1 after irradiation").

Subsequently, the same operation as described above is performed, except that the ink film formed on a recording medium is not irradiated with an active energy ray and the amount of photopolymerizable monomers is measured (hereinafter, referred to as "amount of monomers X1 before irradiation").

The ink reaction rate (%) is calculated using the following equation on the basis of the amount of monomers X1 after irradiation and the amount of monomers X1 before irradiation.

Ink reaction rate (%)=((amount of monomers X1 before irradiation−amount of monomers X1 after irradiation)/amount of monomers X1 before irradiation)×100

The active energy ray used in the irradiation step (i.e., the active energy ray used for pinning exposure and/or full exposure; the same applies hereinafter) is preferably ultraviolet light (i.e., UV light) and is more preferably UV light having a maximum illuminance at a wavelength of 385 to 410 nm.

A common UV light source known in the related art in which at least one of illuminance or irradiation time is variable can be used as a UV light source (i.e., a source of UV light).

The UV light source is preferably a light-emitting diode (LED) light source.

The irradiation with an active energy ray in the irradiation step may be performed in an environment having an oxygen concentration of 20% by volume or less (more preferably less than 20% by volume and further preferably 5% by volume or less). In such a case, the possibility of the polymerization reaction being inhibited by oxygen is reduced and, consequently, an image having higher adhesiveness to recording media is formed.

The environment having an oxygen concentration of less than 20% by volume is preferably an atmosphere containing an inert gas (e.g., a nitrogen gas, an argon gas, or a helium gas).

The illuminance of the active energy ray used for the pinning exposure is preferably 0.10 to 0.50 W/cm, is more preferably 0.20 to 0.49 W/cm, and is further preferably 0.20 to 0.45 W/cm in order to more easily achieve the above-described ink reaction rate.

The amount of irradiation energy of the active energy ray used for the pinning exposure (hereinafter, also referred to as "amount of exposure") is preferably 2 to 20 mJ/cm$^2$ and is more preferably 4 to 15 mJ/cm$^2$ in order to more easily achieve the above-described ink reaction rate.

The illuminance of the active energy ray used for the full exposure is preferably 1.0 W/cm or more, is more preferably 2.0 W/cm or more, and is further preferably 4.0 W/cm or more in order to further enhance the adhesiveness of the image to a recording medium.

The upper limit for the illuminance of the active energy ray used for the full exposure is not set and may be, for example, 10 W/cm.

The amount of irradiation energy of the active energy ray used for the full exposure (i.e., "amount of exposure") is preferably 20 mJ/cm$^2$ or more and is more preferably 80 mJ/cm$^2$ or more in order to further enhance the adhesiveness of the image to a recording medium.

The upper limit for the amount of irradiation energy of the active energy ray used for the full exposure is not set and may be, for example, 240 mJ/cm$^2$.

Second Application Step

The image recording method according to the present disclosure may include a second application step of applying a second ink onto the ink film that has been irradiated with an active energy ray in the first irradiation step (hereinafter, also referred to as "first ink film") to form a second ink film in contact with the first ink film.

The second ink is preferably an active energy ray-curable ink that includes a photopolymerizable monomer, a photopolymerization initiator, and a colorant and is more preferably the ink according to the present disclosure.

The number of the types of the second inks used in the second application step may be only one or two or more.

It is preferable that the ink according to the present disclosure used in the first application step (hereinafter, also referred to as "first ink") and the second ink have different hues.

In the case where the first and second inks have different hues, a secondary or higher color image (e.g., a secondary color image) can be recorded.

In the second application step, the second ink may be applied onto both of the first ink film and a region in which the first ink film is absent.

In the second application step, it is sufficient that the second ink be applied onto at least a part of the first ink film; the second ink is not necessarily applied onto the entirety of the first ink film.

The method for the application of the second ink is the same as the method for the application of the first ink. Preferable examples are also the same.

The image recording method according to an aspect of the present disclosure which includes the second application step can be used to record a secondary or higher color image excellent in terms of graininess and glossiness.

Specifically, limiting the average surface tension of the photopolymerizable monomer included in the first ink to 31.0 mN/m or less reduces the surface tension of the first ink and the droplet interference between droplets of the first ink. This enables the formation of a first ink film excellent in terms of graininess and glossiness.

Furthermore, reducing the content of the surfactant in the first ink to 0.01% by mass or less of the total amount of the first ink eliminates or reduces the possibility of the surfactant bleeding on the surface of the first ink film. This reduces the likelihood of the second ink being repelled by the surface of the first ink film and ensures sufficient spreadability of the second ink.

As a result, a secondary or higher color image excellent in terms of graininess and glossiness is formed.

Second Irradiation Step

An image recording method according to an aspect of the present disclosure which includes the second application step may further include a second irradiation step of irradiating the entirety of the first and second ink films with a second active energy ray.

The second irradiation step may be
- a step of performing pinning exposure (i.e., partial curing) of the entirety of the first and second ink films,
- a step of performing full exposure (i.e., full curing) of the entirety of the first and second ink films, or
- a step of performing pinning exposure and full exposure of the entirety of the first and second ink films in this order.

Preferable second active energy rays and preferable conditions for irradiation with the second active energy ray are the same as preferable active energy rays used in the first irradiation step and preferable conditions for irradiation with the active energy ray.

For example, preferable irradiation conditions under which pinning exposure and full exposure are performed in the second irradiation step are the same as preferable irradiation conditions under which pinning exposure and full exposure are performed in the first irradiation step.

Ink Set

An ink set according to the present disclosure includes
a first ink that is the ink according to the present disclosure, and
a second ink that is an active energy ray-curable ink including a photopolymerizable monomer, a photopolymerization initiator, and a colorant.

Since the ink set according to the present disclosure includes a first ink that is the ink according to the present disclosure, the ink set according to the present disclosure has the same advantageous effects as the ink according to the present disclosure.

In addition, in the case where the ink set according to the present disclosure is used in the image recording method according to an aspect of the present disclosure which includes the second application step, a secondary or higher color image (e.g., a secondary color image) excellent in terms of graininess and glossiness is formed for the above-described reasons.

The number of the first or second ink included in the ink set according to the present disclosure may be only one or two or more.

The ink set according to the present disclosure may include a liquid other than the first or second ink.

It is preferable that the first and second inks included in the ink set according to the present disclosure be each independently the ink according to the present disclosure.

The expression "each independently" used herein means that the compositions of the first and second inks may be identical to or different from each other.

In the case where the first and second inks are each independently the ink according to the present disclosure, a secondary or higher color image (e.g., a secondary color image) excellent in terms of graininess and glossiness is formed.

EXAMPLES

Examples of the present disclosure are described below. Note that the present disclosure is not limited by Examples below.

Hereinafter, "parts" and "%" are on a mass basis unless otherwise specified.
Preparation of Pigment Dispersions As pigment dispersions used for preparing inks, a cyan mill base C, a magenta mill base M, a yellow mill base Y, and a black mill base K were prepared.

Specifically, the constituents of each of the pigment dispersions were charged into a disperser "Motor Mill M50" produced by Eiger and dispersed using zirconia beads having a diameter of 0.65 mm at a rotation speed of 9 m/s for 8 hours to prepare a pigment dispersion.
Composition of Cyan Mill Base C
Cyan (C) pigment: "IRGALITE BLUE GLVO" produced by Ciba Specialty Chemicals Inc.: 30 parts by mass
SR9003 produced by Sartomer (propoxylated (2) neopentyl glycol diacrylate): 50 parts by mass
SOLSPERSE 32000 produced by Lubrizol (pigment dispersing agent): 20 parts by mass Composition of Magenta Mill Base M
Magenta (M) pigment: "CINQUASIA MAGENTA RT-355D" produced by BASF SE Japan: 30 parts by mass
SR9003 produced by Sartomer (propoxylated (2) neopentyl glycol diacrylate): 50 parts by mass
SOLSPERSE 32000 produced by Lubrizol (pigment dispersing agent): 20 parts by mass
Composition of Yellow Mill Base Y
Yellow (Y) pigment: "NOVOPERM YELLOW H2G" produced by Clariant AG: 30 parts by mass
SR9003 produced by Sartomer (propoxylated (2) neopentyl glycol diacrylate): 50 parts by mass
SOLSPERSE 32000 produced by Lubrizol (pigment dispersing agent): 20 parts by mass
Composition of Black Mill Base K
Black (K) pigment: "SPECIAL BLACK 250" produced by BASF SE Japan: 30 parts by mass
SR9003 produced by Sartomer (propoxylated (2) neopentyl glycol diacrylate): 50 parts by mass
SOLSPERSE 32000 produced by Lubrizol (pigment dispersing agent): 20 parts by mass Preparation of Cyan (C) Inks Inks C1 to C85 for Examples and inks CR1 to CR6 for Comparative Examples, which were cyan inks (hereinafter, also referred to as "C inks"), were each prepared by mixing the constituents described in Tables 1 to 9 with one another.

Preparation of Magenta (M) Inks

Inks M1 to M85 for Examples and inks MR1 to MR6 for Comparative Examples, which were magenta inks (hereinafter, also referred to as "M inks"), were each prepared.

The inks M1 to M85 and MR1 to MR6 were prepared in the same manner as the inks C1 to C85 and CR1 to CR6, respectively, except that the cyan mill base C (8 parts by mass) and Omnirad TPO (7 parts by mass) were changed to the magenta mill base M (12 parts by mass) and Omnirad TPO (3 parts by mass).

Preparation of Yellow (Y) Inks

Inks Y1 to Y85 for Examples and inks YR1 to YR6 for Comparative Examples, which were yellow inks (hereinafter, also referred to as "Y inks"), were each prepared.

The inks Y1 to Y85 and YR1 to YR6 were prepared in the same manner as the inks C1 to C85 and CR1 to CR6, respectively, except that the cyan mill base C (8 parts by mass) was changed to the yellow mill base Y (8 parts by mass).

Preparation of Black (K) Inks

Inks K1 to K85 for Examples and inks KR1 to KR6 for Comparative Examples, which were black inks (hereinafter, also referred to as "K inks"), were each prepared.

The inks K1 to K85 and KR1 to KR6 were prepared in the same manner as the inks C1 to C85 and CR1 to CR6, respectively, except that the cyan mill base C (8 parts by mass) was changed to the black mill base K (8 parts by mass).

Preparation of Image Recording Apparatus

An image recording apparatus (specifically, an ink jet recording apparatus) was prepared that included a transport system that transports a recording medium; and a head for black ink, an ultraviolet (UV) light source, a head for cyan ink, an UV light source, a head for magenta ink, an UV light source, a head for yellow ink, an UV light source, a head for white ink, and a nitrogen purge UV exposure machine that were arranged in order from the upstream side in the direction in which a recording medium is transported. The transport system was a single-pass transport system of a sheet-fed printing press. The order in which the above heads were arranged was changeable in accordance with the order in which ink droplets were to be ejected.

The heads for black, cyan, magenta, and yellow inks were piezoelectric ink jet heads (specifically, line heads) including ink jet nozzles (hereinafter, also referred to simply as "nozzles"). Each of the nozzles was capable of ejecting multi-size dots having a volume of 1 to 60 pL at a resolution of 1,200 dpi×1,200 dpi. Note that "dpi" refers to the number of dots per inch (2.54 cm).

The ink feed system of the ink jet recording apparatus was constituted by source tanks, feed pipes, ink feed tanks disposed immediately before the ink jet heads, filters, and the ink jet heads. In the image recording performed in Examples, the portions of the ink feed system from the ink feed tanks to the ink jet heads were thermally insulated and heated. Furthermore, a temperature sensor was disposed in the vicinity of each of the ink feed tanks and the nozzles of the ink jet heads and temperature control was performed such that the temperatures of the nozzle portions were always 70° C.±2° C. Note that, in the examples where an ink including a gelling agent was used (Examples C80 and C81), temperature control was performed such that the temperatures of the nozzle portions were always 90° C.±2° C.

One of the inks K1 to K85 and KR1 to KR6 was charged into the source tank connected to the head for black ink.

One of the inks C1 to C85 and CR1 to CR6 was charged into the source tank connected to the head for cyan ink.

One of the inks M1 to M85 and MR1 to MR6 was charged into the source tank connected to the head for magenta ink.

One of the inks Y1 to Y85 and YR1 to YR6 was charged into the source tank connected to the head for yellow ink.

The UV light sources disposed immediately after the ink jet heads and the UV light source included in the nitrogen purge UV exposure machine were light-emitting diode (LED) lamps produced by KYOCERA Corporation (width: 4 cm, G4B, maximum illuminance: 10 W) capable of emitting UV light having a maximum illuminance at wavelengths of 385 to 410 nm.

The illuminance of UV light emitted from these UV light sources and the time for irradiation with the UV light emitted from the UV light sources were changeable.

In the image recording performed in Examples, the speed at which a recording medium was transported was adjusted such that the irradiation of ink droplets discharged from the heads onto the recording medium with UV light was started 0.1 seconds after the ink droplets landed on the recording medium.

Examples C1 to C85 and Comparative Examples CR1 to CR6

In the evaluation of primary color images, images were recorded using the cyan inks (C inks, that is, the inks C1 to C85 and CR1 to CR6), the image recording apparatus, and a recording medium "OK Top Coat Paper" (84.9 g/m²) produced by Oji Paper Co., Ltd. in accordance with the above image recording method and were evaluated in terms of the following items.

In the evaluation of secondary colors, furthermore, the magenta inks (M inks, that is, the inks M1 to M85 and MR1 to MR6) and the yellow inks (Y inks, that is, the inks Y1 to Y85 and YR1 to YR6) were used.

Evaluations of Primary Color Image

Each C ink was applied onto the recording medium in a halftone pattern at a dot percent of 70% using the above image recording apparatus. The C ink deposited on the recording medium was irradiated with UV light having an illuminance of 0.40 W/cm² for 0.024 seconds (pinning exposure) and subsequently irradiated with UV light having an illuminance of 5.0 W/cm² for 0.024 seconds (full exposure) to form a primary color image that was a cyan halftone image.

In this evaluation, pinning exposure was performed in an air atmosphere having an oxygen concentration of 20%.

Full exposure was performed in an atmosphere having an oxygen concentration of 1% and a nitrogen concentration of 99% by purging, with nitrogen, the atmosphere for irradiation with UV light.

Graininess Evaluation

The primary color image was visually inspected and the graininess of the primary color image was evaluated in accordance with the following evaluation criteria.

Tables 1 to 9 list the results.

In the following evaluation criteria, an image that was the most excellent in terms of graininess (i.e., having the lowest graininess) is rated as "5".

Criteria for Evaluating Graininess

5: The image had no graininess and was homogeneous as a whole.

4: The image slightly had minute graininess, but was substantially homogeneous as a whole.

3: The image had minute graininess, but was acceptable for practical use.

2: The image had considerable graininess that was visually conspicuous, and was unacceptable for practical use.

1: The image had considerable graininess that formed strong inconsistencies in density, and was far from homogeneous.

Glossiness Evaluation

The glossiness of the primary color image was measured with "High Gloss Meter IG-410" produced by HORIBA, Ltd. under 60° gloss conditions and was evaluated in accordance with the following evaluation criteria.

Tables 1 to 9 list the results.

In the following evaluation criteria, an image that was the most excellent in terms of glossiness is rated as "5".

Criteria for Evaluating Glossiness

5: The glossiness was 35 or more and less than 50.
4: The glossiness was 30 or more and less than 35.
3: The glossiness was 25 or more and less than 30.
2: The glossiness was 20 or more and less than 25.
1: The glossiness was less than 20.

Adhesiveness Evaluation

A piece of Sellotape (registered trademark) having a width of 1 cm was put onto the primary color image. The peel force between the recording medium and the primary color image (i.e., the force (N/cm) required for peeling the primary color image from the recording medium) was measured using a standard model digital force gauge "ZTS series", a vertical motorized test stand "MX2 series", and a 90-degree peel test fixture "P90-200N/200N-EZ film grip FC series" produced by IMADA Co., Ltd. at a peeling speed of 300 mm/min. On the basis of the results, the adhesiveness of the primary color image was evaluated in accordance with the following evaluation criteria.

Criteria for Evaluating Adhesiveness

5: The peeling force was 0.5 N or more.
4: The peeling force was 0.3 N/cm or more and less than 0.5 N/cm.
3: The peeling force was 0.2 N/cm or more and less than 0.3 N/cm.
2: The peeling force was 0.1 N/cm or more and less than 0.2 N/cm.
1: The peeling force was less than 0.1 N/cm.

Evaluations of Secondary Color Image (C→M)

Each C ink was applied onto a recording medium in a solid pattern at a dot percent of 100% using the above image recording apparatus. The C ink (i.e., a C ink film) deposited on the recording medium was irradiated with UV light having an illuminance of 0.40 W/cm$^2$ for 0.024 seconds (pinning exposure). Subsequently, an M ink was applied onto the C ink that had been irradiated with UV light in a halftone pattern at a dot percent of 70%. The entirety of the C ink film and the M ink deposited on the C ink in a halftone pattern was irradiated with UV light having an illuminance of 5.0 W/cm$^2$ for 0.024 seconds (full exposure) to form a secondary color image (C→M).

The specific combinations of the C and M inks were as described in Tables 1 to 9.

In this evaluation, pinning exposure was performed in an air atmosphere having an oxygen concentration of 20%.

Full exposure was performed in an atmosphere having an oxygen concentration of 1% and a nitrogen concentration of 99% by purging, with nitrogen, the atmosphere for irradiation with UV light.

The secondary color image (C→M) was evaluated in terms of graininess, glossiness, and adhesiveness by the same methods in accordance with the same evaluation criteria as the primary color image.

Tables 1 to 9 list the results.

Evaluations of Secondary Color Image (C→Y)

The graininess, glossiness, and adhesiveness of a secondary color image (C→Y) were evaluated in the same manner as those of the secondary color image (C→M), except that the M ink was changed to a Y ink.

Tables 1 to 9 list the results.

The specific combinations of the C and Y inks were as described in Tables 1 to 9.

TABLE 1

| | Type | Number of functional groups | Surface tension | Tg | Category | Example C1 C1 | Example C2 C2 | Example C3 C3 | Example C4 C4 |
|---|---|---|---|---|---|---|---|---|---|
| | | | | | | | C ink | | |
| Photo- | ISTA | 1 | 26.3 | −18 | A1 | 64.6 | | | |
| polymer- | NA | 1 | 26.5 | −37 | | | 64.6 | | |
| izable | STA | 1 | 26.6 | 30 | | | | 64.6 | |
| monomer | TMCHA | 1 | 27.3 | 29 | | | | | 64.6 |
| | OA | 1 | 27.5 | −65 | | | | | |
| | INA | 1 | 27.5 | −58 | | | | | |
| | IOA | 1 | 28.0 | −54 | | | | | |
| | IDA | 1 | 28.3 | −62 | | | | | |
| | TBCHA | 1 | 28.5 | 65 | | | | | |
| | TDA | 1 | 28.9 | −55 | | | | | |
| | LA | 1 | 29.3 | −23 | | | | | |
| | EOEOEA | 1 | 30.1 | −67 | | | | | |
| | MEDOL10 | 1 | 31.0 | −7 | | | | | |
| | IBOA | 1 | 31.3 | 96 | A2 | | | | |
| | APG200 | 2 | 32.0 | 90 | | | | | |
| | NPGPODA | 2 | 32.0 | 32 | | | | | |
| | DVE-3 | 2 | 32.2 | 10 | | | | | |
| | APG400 | 2 | 32.2 | −8 | | | | | |
| | DPGDA | 2 | 33.0 | 104 | | | | | |
| | 3MPDDA | 2 | 33.1 | 50 | | | | | |
| | VEEA | 2 | 33.3 | 10 | | | | | |
| | SR595 | 2 | 33.4 | 20 | | | | | |
| | HDDA | 2 | 34.0 | 43 | | | | | |
| | CTFA | 1 | 34.1 | 27 | | | | | |
| | POTMPTA | 3 | 34.4 | −15 | | | | | |
| | SR355 | 4 | 36.0 | 98 | | | | | |
| | DMAA | 1 | 36.4 | 119 | | | | | |
| | TMPTA | 3 | 36.6 | 62 | | | | | |
| | 4-HBA | 1 | 37.0 | −32 | | | | | |
| | EOTMPTA | 3 | 37.9 | −40 | | | | | |
| | PEA | 1 | 39.2 | 2 | | | | | |
| | NVC | 1 | 38.6 | 135 | N1 | 15 | 15 | 15 | 15 |

TABLE 1-continued

|  |  | Example C5 | Example C6 | Example C7 | Example C8 | Example C9 | Example C10 |
|---|---|---|---|---|---|---|---|
|  |  |  |  | C ink |  |  |  |
|  | Type | C5 | C6 | C7 | C8 | C9 | C10 |
| Photopolymerizable monomer | ISTA |  |  |  |  |  |  |
|  | NA |  |  |  |  |  |  |
|  | STA |  |  |  |  |  |  |
|  | TMCHA |  |  |  |  |  |  |
|  | OA | 64.6 |  |  |  |  |  |
|  | INA |  | 64.6 |  |  |  |  |
|  | IOA |  |  | 64.6 |  |  |  |
|  | IDA |  |  |  | 64.6 |  |  |
|  | TBCHA |  |  |  |  | 64.6 |  |
|  | TDA |  |  |  |  |  | 64.6 |
|  | LA |  |  |  |  |  |  |
|  | EOEOEA |  |  |  |  |  |  |
|  | MEDOL10 |  |  |  |  |  |  |
|  | IBOA |  |  |  |  |  |  |
|  | APG200 |  |  |  |  |  |  |
|  | NPGPODA |  |  |  |  |  |  |
|  | DVE-3 |  |  |  |  |  |  |
|  | APG400 |  |  |  |  |  |  |
|  | DPGDA |  |  |  |  |  |  |
|  | 3MPDDA |  |  |  |  |  |  |
|  | VEEA |  |  |  |  |  |  |
|  | SR595 |  |  |  |  |  |  |
|  | HDDA |  |  |  |  |  |  |
|  | CTFA |  |  |  |  |  |  |
|  | POTMPTA |  |  |  |  |  |  |
|  | SR355 |  |  |  |  |  |  |
|  | DMAA |  |  |  |  |  |  |
|  | TMPTA |  |  |  |  |  |  |
|  | 4-HBA |  |  |  |  |  |  |
|  | EOTMPTA |  |  |  |  |  |  |
|  | PEA |  |  |  |  |  |  |
|  | NVC | 15 | 15 | 15 | 15 | 15 | 15 |

|  |  | Example C1 | Example C2 | Example C3 | Example C4 | Example C5 | Example C6 | Example C7 | Example C8 | Example C9 | Example C10 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 |  |  |  |  |  |  |  |  |  |  |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  |  |
|  | KAO WAX T1 |  |  |  |  |  |  |  |  |  |  |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 4.3 | 4.3 | 4.3 | 4.3 | 4.3 | 4.3 | 4.3 | 4.3 | 4.3 | 4.3 |
| Average surface tension of photopolymerizable monomer [mN/m] |  | 28.7 | 28.9 | 29.0 | 29.5 | 29.7 | 29.7 | 30.1 | 30.3 | 30.5 | 30.8 |
| Average Tg of photopolymerizable monomer [° C.] |  | 12 | −3 | 49 | 48 | −25 | −20 | −17 | −23 | 77 | −17 |
| Primary color evaluation | Graininess | 4 | 4 | 5 | 5 | 4 | 4 | 4 | 4 | 5 | 3 |
|  | Glossiness | 3 | 3 | 4 | 5 | 3 | 3 | 3 | 3 | 5 | 3 |
|  | Adhesiveness | 3 | 3 | 5 | 5 | 3 | 3 | 3 | 3 | 4 | 3 |
| Secondary color evaluation (C→M) | M ink | M1 | M2 | M3 | M4 | M5 | M6 | M7 | M8 | M9 | M10 |
|  | Graininess | 4 | 4 | 5 | 5 | 4 | 4 | 4 | 4 | 5 | 3 |
|  | Glossiness | 3 | 3 | 4 | 5 | 3 | 3 | 3 | 3 | 5 | 3 |
|  | Adhesiveness | 3 | 3 | 5 | 5 | 3 | 3 | 3 | 3 | 4 | 3 |
| Secondary color evaluation (C→Y) | Y ink | Y1 | Y2 | Y3 | Y4 | Y5 | Y6 | Y7 | Y8 | Y9 | Y10 |
|  | Graininess | 4 | 4 | 5 | 5 | 4 | 4 | 4 | 4 | 5 | 3 |
|  | Glossiness | 3 | 3 | 4 | 5 | 3 | 3 | 3 | 3 | 5 | 3 |
|  | Adhesiveness | 3 | 3 | 5 | 5 | 3 | 3 | 3 | 3 | 4 | 3 |

TABLE 2

| | Type | Number of functional groups | Surface tension | Tg | Category | Example C11 C ink C11 | Example C12 C12 | Example C13 C13 | Example C14 C14 |
|---|---|---|---|---|---|---|---|---|---|
| Photo-polymer-izable monomer | ISTA | 1 | 26.3 | −18 | A1 | 34.6 | | | |
| | NA | 1 | 26.5 | −37 | | | 34.6 | | |
| | STA | 1 | 26.6 | 30 | | 30 | 30 | 30 | 30 |
| | TMCHA | 1 | 27.3 | 29 | | | | 34.6 | |
| | OA | 1 | 27.5 | −65 | | | | | 34.6 |
| | INA | 1 | 27.5 | −58 | | | | | |
| | IOA | 1 | 28.0 | −54 | | | | | |
| | IDA | 1 | 28.3 | −62 | | | | | |
| | TBCHA | 1 | 28.5 | 65 | | | | | |
| | TDA | 1 | 28.9 | −55 | | | | | |
| | LA | 1 | 29.3 | −23 | | | | | |
| | EOEOEA | 1 | 30.1 | −67 | | | | | |
| | MEDOL10 | 1 | 31.0 | −7 | | | | | |
| | IBOA | 1 | 31.3 | 96 | A2 | | | | |
| | APG200 | 2 | 32.0 | 90 | | | | | |
| | NPGPODA | 2 | 32.0 | 32 | | | | | |
| | DVE-3 | 2 | 32.2 | 10 | | | | | |
| | APG400 | 2 | 32.2 | −8 | | | | | |
| | DPGDA | 2 | 33.0 | 104 | | | | | |
| | 3MPDDA | 2 | 33.1 | 50 | | | | | |
| | VEEA | 2 | 33.3 | 10 | | | | | |
| | SR595 | 2 | 33.4 | 20 | | | | | |
| | HDDA | 2 | 34.0 | 43 | | | | | |
| | CTFA | 1 | 34.1 | 27 | | | | | |
| | POTMPTA | 3 | 34.4 | −15 | | | | | |
| | SR355 | 4 | 36.0 | 98 | | | | | |
| | DMAA | 1 | 36.4 | 119 | | | | | |
| | TMPTA | 3 | 36.6 | 62 | | | | | |
| | 4-HBA | 1 | 37.0 | −32 | | | | | |
| | EOTMPTA | 3 | 37.9 | −40 | | | | | |
| | PEA | 1 | 39.2 | 2 | | | | | |
| | NVC | 1 | 38.6 | 135 | N1 | 15 | 15 | 15 | 15 |

| | | Example C15 C ink C15 | Example C16 C16 | Example C17 C17 | Example C18 C18 | Example C19 C19 | Example C20 C20 |
|---|---|---|---|---|---|---|---|
| | Type | | | | | | |
| Photo-polymer izable monomer | ISTA | | | | | | |
| | NA | | | | | | |
| | STA | 30 | 30 | 30 | 30 | 30 | 30 |
| | TMCHA | | | | | | |
| | OA | | | | | | |
| | INA | 34.6 | | | | | |
| | IOA | | 34.6 | | | | |
| | IDA | | | 34.6 | | | |
| | TBCHA | | | | | | |
| | TDA | | | | 34.6 | | |
| | LA | | | | | 34.6 | |
| | EOEOEA | | | | | | 34.6 |
| | MEDOL10 | | | | | | |
| | IBOA | | | | | | |
| | APG200 | | | | | | |
| | NPGPODA | | | | | | |
| | DVE-3 | | | | | | |
| | APG400 | | | | | | |
| | DPGDA | | | | | | |
| | 3MPDDA | | | | | | |
| | VEEA | | | | | | |
| | SR595 | | | | | | |
| | HDDA | | | | | | |
| | CTFA | | | | | | |
| | POTMPTA | | | | | | |
| | SR355 | | | | | | |
| | DMAA | | | | | | |
| | TMPTA | | | | | | |
| | 4-HBA | | | | | | |
| | EOTMPTA | | | | | | |
| | PEA | | | | | | |
| | NVC | 15 | 15 | 15 | 15 | 15 | 15 |

TABLE 2-continued

|  |  | Example C11 | Example C12 | Example C13 | Example C14 | Example C15 | Example C16 | Example C17 | Example C18 | Example C19 | Example C20 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 |  |  |  |  |  |  |  |  |  |  |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  |  |
|  | KAO WAX T1 |  |  |  |  |  |  |  |  |  |  |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 4.3 | 4.3 | 4.3 | 4.3 | 4.3 | 4.3 | 4.3 | 4.3 | 4.3 | 4.3 |
| Average surface tension of photopolymerizable monomer [mN/m] |  | 28.8 | 28.9 | 29.3 | 29.4 | 29.4 | 29.6 | 29.7 | 29.9 | 30.1 | 30.4 |
| Average Tg of photopolymerizable monomer [° C.] |  | 29 | 21 | 49 | 9 | 12 | 14 | 11 | 14 | 27 | 9 |
| Primary color evaluation | Graininess | 5 | 5 | 5 | 4 | 4 | 4 | 4 | 4 | 4 | 4 |
|  | Glossiness | 4 | 4 | 4 | 3 | 3 | 3 | 3 | 3 | 4 | 3 |
|  | Adhesiveness | 4 | 4 | 5 | 3 | 3 | 3 | 3 | 3 | 4 | 3 |
| Secondary color evaluation (C→M) | M ink | M11 | M12 | M13 | M14 | M15 | M16 | M17 | M18 | M19 | M20 |
|  | Graininess | 5 | 5 | 5 | 4 | 4 | 4 | 4 | 4 | 4 | 4 |
|  | Glossiness | 4 | 4 | 4 | 3 | 3 | 3 | 3 | 3 | 4 | 3 |
|  | Adhesiveness | 4 | 4 | 5 | 3 | 3 | 3 | 3 | 3 | 4 | 3 |
| Secondary color evaluation (C→Y) | Y ink | Y11 | Y12 | Y13 | Y14 | Y15 | Y16 | Y17 | Y18 | Y19 | Y20 |
|  | Graininess | 5 | 5 | 5 | 4 | 4 | 4 | 4 | 4 | 4 | 4 |
|  | Glossiness | 4 | 4 | 4 | 3 | 3 | 3 | 3 | 3 | 4 | 3 |
|  | Adhesiveness | 4 | 4 | 5 | 3 | 3 | 3 | 3 | 3 | 4 | 3 |

TABLE 3

|  |  |  |  |  |  | Example C21 | Example C22 | Example C23 | Example C24 |
|---|---|---|---|---|---|---|---|---|---|
|  |  | Number of functional | Surface |  | Cate- | C ink | | | |
|  | Type | groups | tension | Tg | gory | C21 | C22 | C23 | C24 |
| Photopolymerizable monomer | ISTA | 1 | 26.3 | −18 | A1 |  | 34.6 |  |  |
|  | NA | 1 | 26.5 | −37 |  |  |  | 34.6 |  |
|  | STA | 1 | 26.6 | 30 |  | 30 |  |  | 34.6 |
|  | TMCHA | 1 | 27.3 | 29 |  |  | 30 | 30 | 30 |
|  | OA | 1 | 27.5 | −65 |  |  |  |  |  |
|  | INA | 1 | 27.5 | −58 |  |  |  |  |  |
|  | IOA | 1 | 28.0 | −54 |  |  |  |  |  |
|  | IDA | 1 | 28.3 | −62 |  |  |  |  |  |
|  | TBCHA | 1 | 28.5 | 65 |  |  |  |  |  |
|  | TDA | 1 | 28.9 | −55 |  |  |  |  |  |
|  | LA | 1 | 29.3 | −23 |  |  |  |  |  |
|  | EOEOEA | 1 | 30.1 | −67 |  |  |  |  |  |
|  | MEDOL10 | 1 | 31.0 | −7 |  | 34.6 |  |  |  |
|  | IBOA | 1 | 31.3 | 96 | A2 |  |  |  |  |
|  | APG200 | 2 | 32.0 | 90 |  |  |  |  |  |
|  | NPGPODA | 2 | 32.0 | 32 |  |  |  |  |  |
|  | DVE-3 | 2 | 32.2 | 10 |  |  |  |  |  |
|  | APG400 | 2 | 32.2 | −8 |  |  |  |  |  |
|  | DPGDA | 2 | 33.0 | 104 |  |  |  |  |  |
|  | 3MPDDA | 2 | 33.1 | 50 |  |  |  |  |  |
|  | VEEA | 2 | 33.3 | 10 |  |  |  |  |  |
|  | SR595 | 2 | 33.4 | 20 |  |  |  |  |  |
|  | HDDA | 2 | 34.0 | 43 |  |  |  |  |  |
|  | CTFA | 1 | 34.1 | 27 |  |  |  |  |  |
|  | POTMPTA | 3 | 34.4 | −15 |  |  |  |  |  |
|  | SR355 | 4 | 36.0 | 98 |  |  |  |  |  |
|  | DMAA | 1 | 36.4 | 119 |  |  |  |  |  |
|  | TMPTA | 3 | 36.6 | 62 |  |  |  |  |  |
|  | 4-HBA | 1 | 37.0 | −32 |  |  |  |  |  |
|  | EOTMPTA | 3 | 37.9 | −40 |  |  |  |  |  |
|  | PEA | 1 | 39.2 | 2 |  |  |  |  |  |
|  | NVC | 1 | 38.6 | 135 | N1 | 15 | 15 | 15 | 15 |

TABLE 3-continued

|  |  | Example C25 | Example C26 | Example C27 | Example C28 | Example C29 | Example C30 |
|---|---|---|---|---|---|---|---|
|  |  | | | C ink | | | |
|  | Type | C25 | C26 | C27 | C28 | C29 | C30 |
| Photo-polymerizable monomer | ISTA | | | | | | |
|  | NA | | | | | | |
|  | STA | | | | | | |
|  | TMCHA | 30 | 30 | 30 | 30 | 30 | 30 |
|  | OA | 34.6 | | | | | |
|  | INA | | 34.6 | | | | |
|  | IOA | | | 34.6 | | | |
|  | IDA | | | | 34.6 | | |
|  | TBCHA | | | | | | |
|  | TDA | | | | | 34.6 | |
|  | LA | | | | | | 34.6 |
|  | EOEOEA | | | | | | |
|  | MEDOL10 | | | | | | |
|  | IBOA | | | | | | |
|  | APG200 | | | | | | |
|  | NPGPODA | | | | | | |
|  | DVE-3 | | | | | | |
|  | APG400 | | | | | | |
|  | DPGDA | | | | | | |
|  | 3MPDDA | | | | | | |
|  | VEEA | | | | | | |
|  | SR595 | | | | | | |
|  | HDDA | | | | | | |
|  | CTFA | | | | | | |
|  | POTMPTA | | | | | | |
|  | SR355 | | | | | | |
|  | DMAA | | | | | | |
|  | TMPTA | | | | | | |
|  | 4-HBA | | | | | | |
|  | EOTMPTA | | | | | | |
|  | PEA | | | | | | |
|  | NVC | 15 | 15 | 15 | 15 | 15 | 15 |

|  |  | Example C21 | Example C22 | Example C23 | Example C24 | Example C25 | Example C26 | Example C27 | Example C28 | Example C29 | Example C30 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 | | | | | | | | | | |
| Sensitizer | ITX | 2 | 2 | 2 | 2 | 2 | 2 | 2 | 2 | 2 | 2 |
|  | Speedcure 7010 | | | | | | | | | | |
| Gelling agent | UNISTER M-2222SL | | | | | | | | | | |
|  | KAO WAX T1 | | | | | | | | | | |
|  | UNISTER H-476 | | | | | | | | | | |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 | | | | | | | | | | |
| Mass ratio [Monomer A1/Monomer N1] | | 4.3 | 4.3 | 4.3 | 4.3 | 4.3 | 4.3 | 4.3 | 4.3 | 4.3 | 4.3 |
| Average surface tension of photopolymerizable monomer [mN/m] | | 30.8 | 29.1 | 29.2 | 29.2 | 29.6 | 29.6 | 29.8 | 29.9 | 30.2 | 30.4 |
| Average Tg of photopolymerizable monomer [° C.] | | 34 | 29 | 21 | 49 | 9 | 12 | 14 | 10 | 13 | 27 |
| Primary color evaluation | Graininess | 4 | 5 | 5 | 5 | 4 | 4 | 4 | 4 | 4 | 4 |
|  | Glossiness | 5 | 4 | 4 | 4 | 3 | 3 | 3 | 3 | 3 | 4 |
|  | Adhesiveness | 4 | 4 | 4 | 5 | 3 | 3 | 3 | 3 | 3 | 4 |
| Secondary color evaluation (C→M) | M ink | M21 | M22 | M23 | M24 | M25 | M26 | M27 | M28 | M29 | M30 |
|  | Graininess | 4 | 5 | 5 | 5 | 4 | 4 | 4 | 4 | 4 | 4 |
|  | Glossiness | 5 | 4 | 4 | 4 | 3 | 3 | 3 | 3 | 3 | 4 |
|  | Adhesiveness | 4 | 4 | 4 | 5 | 3 | 3 | 3 | 3 | 3 | 4 |
| Secondary color evaluation (C→Y) | Y ink | Y21 | Y22 | Y23 | Y24 | Y25 | Y26 | Y27 | Y28 | Y29 | Y30 |
|  | Graininess | 4 | 5 | 5 | 5 | 4 | 4 | 4 | 4 | 4 | 4 |
|  | Glossiness | 5 | 4 | 4 | 4 | 3 | 3 | 3 | 3 | 3 | 4 |
|  | Adhesiveness | 4 | 4 | 4 | 5 | 3 | 3 | 3 | 3 | 3 | 4 |

TABLE 4

| | Type | Number of functional groups | Surface tension | Tg | Category | Example C31 C31 | Example C32 C32 | Example C33 C33 | Example C34 C34 | Example C35 C35 | Example C36 C36 | Example C37 C37 | Example C38 C38 | Example C39 C39 | Example C40 C40 |
|---|---|---|---|---|---|---|---|---|---|---|---|---|---|---|---|
| Photo-polymer-izable monomer | ISTA | 1 | 26.3 | −18 | A1 | | 34.6 | | | | | | | | |
| | NA | 1 | 26.5 | −37 | | | | 34.6 | | | | | | | |
| | STA | 1 | 26.6 | 30 | | | | | 34.6 | | | | | | |
| | TMCHA | 1 | 27.3 | 29 | | 30 | | | | 34.6 | | | | | |
| | OA | 1 | 27.5 | −65 | | | | | | | 34.6 | | | | |
| | INA | 1 | 27.5 | −58 | | | 30 | 30 | 30 | 30 | 30 | 30 | 30 | 30 | 30 |
| | IOA | 1 | 28.0 | −54 | | | | | | | | 34.6 | | | |
| | IDA | 1 | 28.3 | −62 | | | | | | | | | 34.6 | | |
| | TBCHA | 1 | 28.5 | 65 | | | | | | | | | | | |
| | TDA | 1 | 28.9 | −55 | | | | | | | | | | 34.6 | |
| | LA | 1 | 29.3 | −23 | | | | | | | | | | | 34.6 |
| | EOEOEA | 1 | 30.1 | −67 | | 34.6 | | | | | | | | | |
| | MEDOL10 | 1 | 31.0 | −7 | | | | | | | | | | | |
| | IBOA | 1 | 31.3 | 96 | A2 | | | | | | | | | | |
| | APG200 | 2 | 32.0 | 90 | | | | | | | | | | | |
| | NPGPODA | 2 | 32.0 | 32 | | | | | | | | | | | |
| | DVE-3 | 2 | 32.2 | 10 | | | | | | | | | | | |
| | APG400 | 2 | 32.2 | −8 | | | | | | | | | | | |
| | DPGDA | 2 | 33.0 | 104 | | | | | | | | | | | |
| | 3MPDDA | 2 | 33.1 | 50 | | | | | | | | | | | |
| | VEEA | 2 | 33.3 | 10 | | | | | | | | | | | |
| | SR595 | 2 | 33.4 | 20 | | | | | | | | | | | |
| | HDDA | 2 | 34.0 | 43 | | | | | | | | | | | |
| | CTFA | 1 | 34.1 | 27 | | | | | | | | | | | |
| | POTMPTA | 3 | 34.4 | −15 | | | | | | | | | | | |
| | SR355 | 4 | 36.0 | 98 | | | | | | | | | | | |
| | DMAA | 1 | 36.4 | 119 | | | | | | | | | | | |
| | TMPTA | 3 | 36.6 | 62 | | | | | | | | | | | |
| | 4-HBA | 1 | 37.0 | −32 | | | | | | | | | | | |
| | EOTMPTA | 3 | 37.9 | −40 | | | | | | | | | | | |
| | PEA | 1 | 39.2 | 2 | | | | | | | | | | | |
| | NVC | 1 | 38.6 | 135 | N1 | 15 | 15 | 15 | 15 | 15 | 15 | 15 | 15 | 15 | 15 |

TABLE 4-continued

|  |  | Example C31 | Example C32 | Example C33 | Example C34 | Example C35 | Example C36 | Example C37 | Example C38 | Example C39 | Example C40 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 |  |  |  |  |  |  |  |  |  |  |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  |  |
|  | KAO WAX T1 |  |  |  |  |  |  |  |  |  |  |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 4.3 | 4.3 | 4.3 | 4.3 | 4.3 | 4.3 | 4.3 | 4.3 | 4.3 | 4.3 |
| Average surface tension of photopolymerizable monomer [mN/m] |  | 30.7 | 29.2 | 29.3 | 29.3 | 29.6 | 29.7 | 29.9 | 30.0 | 30.3 | 30.4 |
| Average Tg of photopolymerizable monomer [° C.] |  | 8 | −3 | −11 | 17 | 17 | −23 | −18 | −21 | −18 | −5 |
| Primary color evaluation | Graininess | 3 | 4 | 4 | 4 | 4 | 4 | 4 | 4 | 4 | 4 |
|  | Glossiness | 3 | 3 | 3 | 3 | 3 | 3 | 3 | 3 | 3 | 3 |
|  | Adhesiveness | 3 | 3 | 3 | 3 | 3 | 3 | 3 | 3 | 3 | 3 |
| Secondary color evaluation (C→M) | M ink | M31 | M32 | M33 | M34 | M35 | M36 | M37 | M38 | M39 | M40 |
|  | Graininess | 3 | 4 | 4 | 4 | 4 | 4 | 4 | 4 | 4 | 4 |
|  | Glossiness | 3 | 3 | 3 | 3 | 3 | 3 | 3 | 3 | 3 | 3 |
|  | Adhesiveness | 3 | 3 | 3 | 3 | 3 | 3 | 3 | 3 | 3 | 3 |
| Secondary color evaluation (C→Y) | Y ink | Y31 | Y32 | Y33 | Y34 | Y35 | Y36 | Y37 | Y38 | Y39 | Y40 |
|  | Graininess | 3 | 4 | 4 | 4 | 4 | 4 | 4 | 4 | 4 | 4 |
|  | Glossiness | 3 | 3 | 3 | 3 | 3 | 3 | 3 | 3 | 3 | 3 |
|  | Adhesiveness | 3 | 3 | 3 | 3 | 3 | 3 | 3 | 3 | 3 | 3 |

TABLE 5

|  |  |  |  |  |  | Example C41 | Example C42 | Example C43 | Example C44 |
|---|---|---|---|---|---|---|---|---|---|
|  | Type | Number of functional groups | Surface tension | Tg | Category | C ink | | | |
|  |  |  |  |  |  | C41 | C42 | C43 | C44 |
| Photopolymerizable monomer | ISTA | 1 | 26.3 | −18 | A1 |  | 34.6 |  |  |
|  | NA | 1 | 26.5 | −37 |  |  |  | 34.6 |  |
|  | STA | 1 | 26.6 | 30 |  |  |  |  | 34.6 |
|  | TMCHA | 1 | 27.3 | 29 |  |  |  |  |  |
|  | OA | 1 | 27.5 | −65 |  |  |  |  |  |
|  | INA | 1 | 27.5 | −58 |  | 30 |  |  |  |
|  | IOA | 1 | 28.0 | −54 |  |  |  |  |  |
|  | IDA | 1 | 28.3 | −62 |  |  |  |  |  |
|  | TBCHA | 1 | 28.5 | 65 |  |  | 30 | 30 | 30 |
|  | TDA | 1 | 28.9 | −55 |  |  |  |  |  |
|  | LA | 1 | 29.3 | −23 |  |  |  |  |  |
|  | EOEOEA | 1 | 30.1 | −67 |  | 34.6 |  |  |  |
|  | MEDOL10 | 1 | 31.0 | −7 |  |  |  |  |  |
|  | IBOA | 1 | 31.3 | 96 | A2 |  |  |  |  |
|  | APG200 | 2 | 32.0 | 90 |  |  |  |  |  |
|  | NPGPODA | 2 | 32.0 | 32 |  |  |  |  |  |
|  | DVE-3 | 2 | 32.2 | 10 |  |  |  |  |  |
|  | APG400 | 2 | 32.2 | −8 |  |  |  |  |  |
|  | DPGDA | 2 | 33.0 | 104 |  |  |  |  |  |
|  | 3MPDDA | 2 | 33.1 | 50 |  |  |  |  |  |
|  | VEEA | 2 | 33.3 | 10 |  |  |  |  |  |
|  | SR595 | 2 | 33.4 | 20 |  |  |  |  |  |
|  | HDDA | 2 | 34.0 | 43 |  |  |  |  |  |
|  | CTFA | 1 | 34.1 | 27 |  |  |  |  |  |
|  | POTMPTA | 3 | 34.4 | −15 |  |  |  |  |  |
|  | SR355 | 4 | 36.0 | 98 |  |  |  |  |  |
|  | DMAA | 1 | 36.4 | 119 |  |  |  |  |  |
|  | TMPTA | 3 | 36.6 | 62 |  |  |  |  |  |
|  | 4-HBA | 1 | 37.0 | −32 |  |  |  |  |  |
|  | EOTMPTA | 3 | 37.9 | −40 |  |  |  |  |  |
|  | PEA | 1 | 39.2 | 2 |  |  |  |  |  |
|  | NVC | 1 | 38.6 | 135 | N1 | 15 | 15 | 15 | 15 |

TABLE 5-continued

|  |  | Example C45 | Example C46 | Example C47 | Example C48 | Example C49 | Example C50 |
|---|---|---|---|---|---|---|---|
|  |  |  |  | C ink |  |  |  |
|  | Type | C45 | C46 | C47 | C48 | C49 | C50 |
| Photo-polymer-izable monomer | ISTA |  |  |  |  |  |  |
|  | NA |  |  |  |  |  |  |
|  | STA |  |  |  |  |  |  |
|  | TMCHA | 34.6 |  |  |  |  |  |
|  | OA |  | 34.6 |  |  |  |  |
|  | INA |  |  | 34.6 |  |  |  |
|  | IOA |  |  |  | 34.6 |  |  |
|  | IDA |  |  |  |  | 34.6 |  |
|  | TBCHA | 30 | 30 | 30 | 30 | 30 | 30 |
|  | TDA |  |  |  |  |  | 34.6 |
|  | LA |  |  |  |  |  |  |
|  | EOEOEA |  |  |  |  |  |  |
|  | MEDOL10 |  |  |  |  |  |  |
|  | IBOA |  |  |  |  |  |  |
|  | APG200 |  |  |  |  |  |  |
|  | NPGPODA |  |  |  |  |  |  |
|  | DVE-3 |  |  |  |  |  |  |
|  | APG400 |  |  |  |  |  |  |
|  | DPGDA |  |  |  |  |  |  |
|  | 3MPDDA |  |  |  |  |  |  |
|  | VEEA |  |  |  |  |  |  |
|  | SR595 |  |  |  |  |  |  |
|  | HDDA |  |  |  |  |  |  |
|  | CTFA |  |  |  |  |  |  |
|  | POTMPTA |  |  |  |  |  |  |
|  | SR355 |  |  |  |  |  |  |
|  | DMAA |  |  |  |  |  |  |
|  | TMPTA |  |  |  |  |  |  |
|  | 4-HBA |  |  |  |  |  |  |
|  | EOTMPTA |  |  |  |  |  |  |
|  | PEA |  |  |  |  |  |  |
|  | NVC | 15 | 15 | 15 | 15 | 15 | 15 |

|  |  | Example C41 | Example C42 | Example C43 | Example C44 | Example C45 | Example C46 | Example C47 | Example C48 | Example C49 | Example C50 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 |  |  |  |  |  |  |  |  |  |  |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  |  |
|  | KAO WAX T1 |  |  |  |  |  |  |  |  |  |  |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 4.3 | 4.3 | 4.3 | 4.3 | 4.3 | 4.3 | 4.3 | 4.3 | 4.3 | 4.3 |
| Average surface tension of photopolymerizable monomer [mN/m] |  | 30.8 | 29.5 | 29.6 | 29.7 | 30.0 | 30.0 | 30.0 | 30.3 | 30.4 | 30.6 |
| Average Tg of photopolymerizable monomer [° C.] |  | −23 | 42 | 34 | 62 | 61 | 22 | 25 | 27 | 23 | 26 |
| Primary color evaluation | Graininess | 3 | 5 | 4 | 5 | 5 | 4 | 4 | 4 | 4 | 4 |
|  | Glossiness | 3 | 5 | 4 | 5 | 5 | 4 | 4 | 4 | 4 | 4 |
|  | Adhesiveness | 3 | 5 | 4 | 4 | 4 | 4 | 4 | 4 | 4 | 4 |
| Secondary color evaluation (C→M) | M ink | M41 | M42 | M43 | M44 | M45 | M46 | M47 | M48 | M49 | M50 |
|  | Graininess | 3 | 5 | 4 | 5 | 5 | 4 | 4 | 4 | 4 | 4 |
|  | Glossiness | 3 | 5 | 4 | 5 | 5 | 4 | 4 | 4 | 4 | 4 |
|  | Adhesiveness | 3 | 5 | 4 | 4 | 4 | 4 | 4 | 4 | 4 | 4 |
| Secondary color evaluation (C→Y) | Y ink | Y41 | Y42 | Y43 | Y44 | Y45 | Y46 | Y47 | Y48 | Y49 | Y50 |
|  | Graininess | 3 | 5 | 4 | 5 | 5 | 4 | 4 | 4 | 4 | 4 |
|  | Glossiness | 3 | 5 | 4 | 5 | 5 | 4 | 4 | 4 | 4 | 4 |
|  | Adhesiveness | 3 | 5 | 4 | 4 | 4 | 4 | 4 | 4 | 4 | 4 |

TABLE 6

|  | Type | Number of functional groups | Surface tension | Tg | Category | Example C51 C51 | Example C52 C52 | Example C53 C53 | Example C54 C54 |
|---|---|---|---|---|---|---|---|---|---|
| | | | | | | C ink | | | |
| Photo-polymer-izable monomer | ISTA | 1 | 26.3 | −18 | A1 | | 34.6 | | |
| | NA | 1 | 26.5 | −37 | | | | 34.6 | |
| | STA | 1 | 26.6 | 30 | | | | | 34.6 |
| | TMCHA | 1 | 27.3 | 29 | | | | | |
| | OA | 1 | 27.5 | −65 | | | | | |
| | INA | 1 | 27.5 | −58 | | | | | |
| | IOA | 1 | 28.0 | −54 | | | | | |
| | IDA | 1 | 28.3 | −62 | | | | | |
| | TBCHA | 1 | 28.5 | 65 | | 30 | | | |
| | TDA | 1 | 28.9 | −55 | | | | | |
| | LA | 1 | 29.3 | −23 | | 34.6 | | | |
| | EOEOEA | 1 | 30.1 | −67 | | | | | |
| | MEDOL10 | 1 | 31.0 | −7 | | | | | |
| | IBOA | 1 | 31.3 | 96 | A2 | | 30 | 30 | 30 |
| | APG200 | 2 | 32.0 | 90 | | | | | |
| | NPGPODA | 2 | 32.0 | 32 | | | | | |
| | DVE-3 | 2 | 32.2 | 10 | | | | | |
| | APG400 | 2 | 32.2 | −8 | | | | | |
| | DPGDA | 2 | 33.0 | 104 | | | | | |
| | 3MPDDA | 2 | 33.1 | 50 | | | | | |
| | VEEA | 2 | 33.3 | 10 | | | | | |
| | SR595 | 2 | 33.4 | 20 | | | | | |
| | HDDA | 2 | 34.0 | 43 | | | | | |
| | CTFA | 1 | 34.1 | 27 | | | | | |
| | POTMPTA | 3 | 34.4 | −15 | | | | | |
| | SR355 | 4 | 36.0 | 98 | | | | | |
| | DMAA | 1 | 36.4 | 119 | | | | | |
| | TMPTA | 3 | 36.6 | 62 | | | | | |
| | 4-HBA | 1 | 37.0 | −32 | | | | | |
| | EOTMPTA | 3 | 37.9 | −40 | | | | | |
| | PEA | 1 | 39.2 | 2 | | | | | |
| | NVR | 1 | 38.6 | 135 | N1 | 15 | 15 | 15 | 15 |

|  | Type | Example C55 C55 | Example C56 C56 | Example C57 C57 | Example C58 C58 | Example C59 C59 | Example C60 C60 |
|---|---|---|---|---|---|---|---|
| | | C ink | | | | | |
| Photo-polymer-izable monomer | ISTA | 21 | | | | | |
| | NA | | | | | | |
| | STA | | 27.6 | 27.6 | 27.6 | 27.6 | 27.6 |
| | TMCHA | | | | | | |
| | OA | | | | | | |
| | INA | | | | | | |
| | IOA | | | | | | |
| | IDA | | | | | | |
| | TBCHA | | | | | | |
| | TDA | | | | | | |
| | LA | | 10 | 10 | 10 | 10 | 10 |
| | EOEOEA | | | | | | |
| | MEDOL10 | | | | | | |
| | IBOA | | 20 | 20 | 20 | 20 | 20 |
| | APG200 | | 10 | | | | |
| | NPGPODA | 58.6 | | 10 | | | |
| | DVE-3 | | | | 10 | | |
| | APG400 | | | | | 10 | |
| | DPGDA | | | | | | 10 |
| | 3MPDDA | | | | | | |
| | VEEA | | | | | | |
| | SR595 | | | | | | |
| | HDDA | | | | | | |
| | CTFA | | | | | | |
| | POTMPTA | | | | | | |
| | SR355 | | | | | | |
| | DMAA | | | | | | |
| | TMPTA | | | | | | |
| | 4-HBA | | | | | | |
| | EOTMPTA | | | | | | |
| | PEA | | | | | | |
| | NVR | | 12 | 12 | 12 | 12 | 12 |

TABLE 6-continued

|  |  | Example C51 | Example C52 | Example C53 | Example C54 | Example C55 | Example C56 | Example C57 | Example C58 | Example C59 | Example C60 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 |  |  |  |  |  |  |  |  |  |  |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  |  |
|  | KAO WAX T1 |  |  |  |  |  |  |  |  |  |  |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 4.3 | 2.3 | 2.3 | 2.3 | — | 3.1 | 3.1 | 3.1 | 3.1 | 3.1 |
| Average surface tension of photopolymerizable monomer [mN/m] |  | 30.8 | 30.6 | 30.6 | 30.7 | 30.6 | 30.7 | 30.7 | 30.7 | 30.7 | 30.8 |
| Average Tg of photopolymerizable monomer [° C.] |  | 40 | 53 | 45 | 73 | 19.3 | 62 | 55 | 52 | 50 | 64 |
| Primary color evaluation | Graininess | 5 | 5 | 5 | 5 | 3 | 5 | 5 | 5 | 5 | 5 |
|  | Glossiness | 5 | 5 | 5 | 5 | 3 | 5 | 5 | 5 | 5 | 5 |
|  | Adhesiveness | 5 | 5 | 5 | 4 | 3 | 4 | 5 | 5 | 5 | 4 |
| Secondary color evaluation (C→M) | M ink | M51 | M52 | M53 | M54 | M55 | M56 | M57 | M58 | M59 | M60 |
|  | Graininess | 5 | 5 | 5 | 5 | 3 | 5 | 5 | 5 | 5 | 5 |
|  | Glossiness | 5 | 5 | 5 | 5 | 3 | 5 | 5 | 5 | 5 | 5 |
|  | Adhesiveness | 5 | 5 | 5 | 4 | 3 | 4 | 5 | 5 | 5 | 4 |
| Secondary color evaluation (C→Y) | Y ink | Y51 | Y52 | Y53 | Y54 | Y55 | Y56 | Y57 | Y58 | Y59 | Y60 |
|  | Graininess | 5 | 5 | 5 | 5 | 3 | 5 | 5 | 5 | 5 | 5 |
|  | Glossiness | 5 | 5 | 5 | 5 | 3 | 5 | 5 | 5 | 5 | 5 |
|  | Adhesiveness | 5 | 5 | 5 | 4 | 3 | 4 | 5 | 5 | 5 | 4 |

TABLE 7

|  |  |  |  |  |  | Example C61 | Example C62 | Example C63 | Example C64 |
|---|---|---|---|---|---|---|---|---|---|
|  | Type | Number of functional groups | Surface tension | Tg | Category | C61 | C62 | C63 | C64 |
|  |  |  |  |  |  | C ink | | | |
| Photopolymerizable monomer | ISTA | 1 | 26.3 | −18 | A1 |  |  |  |  |
|  | NA | 1 | 26.5 | −37 |  |  |  |  |  |
|  | STA | 1 | 26.6 | 30 |  | 27.6 | 27.6 | 27.6 | 27.6 |
|  | TMCHA | 1 | 27.3 | 29 |  |  |  |  |  |
|  | OA | 1 | 27.5 | −65 |  |  |  |  |  |
|  | INA | 1 | 27.5 | −58 |  |  |  |  |  |
|  | IOA | 1 | 28.0 | −54 |  |  |  |  |  |
|  | IDA | 1 | 28.3 | −62 |  |  |  |  |  |
|  | TBCHA | 1 | 28.5 | 65 |  |  |  |  |  |
|  | TDA | 1 | 28.9 | −55 |  |  |  |  |  |
|  | LA | 1 | 29.3 | −23 |  | 10 | 10 | 10 | 10 |
|  | EOEOEA | 1 | 30.1 | −67 |  |  |  |  |  |
|  | MEDOL10 | 1 | 31.0 | −7 |  |  |  |  |  |
|  | IBOA | 1 | 31.3 | 96 | A2 | 20 | 20 | 20 | 20 |
|  | APG200 | 2 | 32.0 | 90 |  |  |  |  |  |
|  | NPGPODA | 2 | 32.0 | 32 |  |  |  |  |  |
|  | DVE-3 | 2 | 32.2 | 10 |  |  |  |  |  |
|  | APG400 | 2 | 32.2 | −8 |  |  |  |  |  |
|  | DPGDA | 2 | 33.0 | 104 |  |  |  |  |  |
|  | 3MPDDA | 2 | 33.1 | 50 |  | 10 |  |  |  |
|  | VEEA | 2 | 33.3 | 10 |  |  | 10 |  |  |
|  | SR595 | 2 | 33.4 | 20 |  |  |  | 10 |  |
|  | HDDA | 2 | 34.0 | 43 |  |  |  |  | 10 |
|  | CTFA | 1 | 34.1 | 27 |  |  |  |  |  |
|  | POTMPTA | 3 | 34.4 | −15 |  |  |  |  |  |
|  | SR355 | 4 | 36.0 | 98 |  |  |  |  |  |
|  | DMAA | 1 | 36.4 | 119 |  |  |  |  |  |
|  | TMPTA | 3 | 36.6 | 62 |  |  |  |  |  |
|  | 4-HBA | 1 | 37.0 | −32 |  |  |  |  |  |
|  | EOTMPTA | 3 | 37.9 | −40 |  |  |  |  |  |
|  | PEA | 1 | 39.2 | 2 |  |  |  |  |  |
|  | NVC | 1 | 38.6 | 135 | N1 | 12 | 12 | 12 | 12 |

TABLE 7-continued

|  |  | Example C65 | Example C66 | Example C67 | Example C68 | Example C69 | Example C70 |
|---|---|---|---|---|---|---|---|
|  |  |  |  | C ink |  |  |  |
|  | Type | C65 | C66 | C67 | C68 | C69 | C70 |
| Photo-polymer-izable monomer | ISTA |  |  | 10 | 10 | 10 | 10 |
|  | NA |  |  |  |  |  |  |
|  | STA | 27.6 | 27.6 | 27.6 | 27.6 | 27.6 | 27.6 |
|  | TMCHA |  |  |  |  |  |  |
|  | OA |  |  |  |  |  |  |
|  | INA |  |  |  |  |  |  |
|  | IOA |  |  |  |  |  |  |
|  | IDA |  |  |  |  |  |  |
|  | TBCHA |  |  |  |  |  |  |
|  | TDA |  |  |  |  |  |  |
|  | LA | 10 | 10 |  |  |  |  |
|  | EOEOEA |  |  |  |  |  |  |
|  | MEDOL10 |  |  |  |  |  |  |
|  | IBOA | 20 | 20 | 20 | 20 | 20 | 20 |
|  | APG200 |  |  |  |  |  |  |
|  | NPGPODA |  |  |  |  |  |  |
|  | DVE-3 |  |  |  |  |  |  |
|  | APG400 |  |  |  |  |  |  |
|  | DPGDA |  |  |  |  |  |  |
|  | 3MPDDA |  |  |  |  |  |  |
|  | VEEA |  |  |  |  |  |  |
|  | SR595 |  |  |  |  |  |  |
|  | HDDA |  |  |  |  |  |  |
|  | CTFA | 10 |  |  |  |  |  |
|  | POTMPTA |  | 10 |  |  |  |  |
|  | SR355 |  |  | 10 |  |  |  |
|  | DMAA |  |  |  | 10 |  |  |
|  | TMPTA |  |  |  |  | 10 |  |
|  | 4-HBA |  |  |  |  |  | 10 |
|  | EOTMPTA |  |  |  |  |  |  |
|  | PEA |  |  |  |  |  |  |
|  | NVC | 12 | 12 | 12 | 12 | 12 | 12 |

|  |  | Example C61 | Example C62 | Example C63 | Example C64 | Example C65 | Example C66 | Example C67 | Example C68 | Example C69 | Example C70 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO | 7 | 7 | 7 | 7 | 7 | 7 | 7 | 7 | 7 | 7 |
|  | P initiator 2 |  |  |  |  |  |  |  |  |  |  |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  |  |
|  | KAO WAX T1 |  |  |  |  |  |  |  |  |  |  |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 3.1 | 3.1 | 3.1 | 3.1 | 3.1 | 3.1 | 3.1 | 3.1 | 3.1 | 3.1 |
| Average surface tension of photopolymerizable monomer [mN/m] |  | 30.8 | 30.8 | 30.8 | 30.9 | 30.9 | 30.9 | 30.8 | 30.8 | 30.9 | 30.9 |
| Average Tg of photopolymerizable monomer [° C.] |  | 57 | 52 | 54 | 56 | 55 | 49 | 64 | 66 | 59 | 48 |
| Primary color evaluation | Graininess | 5 | 5 | 5 | 5 | 5 | 5 | 5 | 5 | 5 | 5 |
|  | Glossiness | 5 | 5 | 5 | 5 | 5 | 5 | 5 | 5 | 5 | 5 |
|  | Adhesiveness | 5 | 5 | 5 | 5 | 5 | 5 | 4 | 4 | 5 | 5 |
| Secondary color evaluation (C→M) | M ink | M61 | M62 | M63 | M64 | M65 | M66 | M67 | M68 | M69 | M70 |
|  | Graininess | 5 | 5 | 5 | 5 | 5 | 5 | 5 | 5 | 5 | 5 |
|  | Glossiness | 5 | 5 | 5 | 5 | 5 | 5 | 5 | 5 | 5 | 5 |
|  | Adhesiveness | 5 | 5 | 5 | 5 | 5 | 5 | 4 | 4 | 5 | 5 |
| Secondary color evaluation (C→Y) | Y ink | Y61 | Y62 | Y63 | Y64 | Y65 | Y66 | Y67 | Y68 | Y69 | Y70 |
|  | Graininess | 5 | 5 | 5 | 5 | 5 | 5 | 5 | 5 | 5 | 5 |
|  | Glossiness | 5 | 5 | 5 | 5 | 5 | 5 | 5 | 5 | 5 | 5 |
|  | Adhesiveness | 5 | 5 | 5 | 5 | 5 | 5 | 4 | 4 | 5 | 5 |

TABLE 8

| | Type | Number of functional groups | Surface tension | Tg | Category | Example C71 C71 | Example C72 C72 | Example C73 C73 | Example C74 C74 |
|---|---|---|---|---|---|---|---|---|---|
| | | | | | | | | C ink | |
| Photo-polymer-izable monomer | ISTA | 1 | 26.3 | −18 | A1 | 10 | | | |
| | NA | 1 | 26.5 | −37 | | | | | |
| | STA | 1 | 26.6 | 30 | | | 27.6 | | |
| | TMCHA | 1 | 27.3 | 29 | | | | 74.6 | 69.6 | 59.6 |
| | OA | 1 | 27.5 | −65 | | | | | |
| | INA | 1 | 27.5 | −58 | | | | | |
| | IOA | 1 | 28.0 | −54 | | | | | |
| | IDA | 1 | 28.3 | −62 | | | | | |
| | TBCHA | 1 | 28.5 | 65 | | | | | |
| | TDA | 1 | 28.9 | −55 | | | | | |
| | LA | 1 | 29.3 | −23 | | | | | |
| | EOEOEA | 1 | 30.1 | −67 | | | | | |
| | MEDOL10 | 1 | 31.0 | −7 | | | | | |
| | IBOA | 1 | 31.3 | 96 | A2 | 21 | | | |
| | APG200 | 2 | 32.0 | 90 | | | | | |
| | NPGPODA | 2 | 32.0 | 32 | | | | | |
| | DVE-3 | 2 | 32.2 | 10 | | | | | |
| | APG400 | 2 | 32.2 | −8 | | | | | |
| | DPGDA | 2 | 33.0 | 104 | | | | | |
| | 3MPDDA | 2 | 33.1 | 50 | | | | | |
| | VEEA | 2 | 33.3 | 10 | | | | | |
| | SR595 | 2 | 33.4 | 20 | | | | | |
| | HDDA | 2 | 34.0 | 43 | | | | | |
| | CTFA | 1 | 34.1 | 27 | | | | | |
| | POTMPTA | 3 | 34.4 | −15 | | | | | |
| | SR355 | 4 | 36.0 | 98 | | | | | |
| | DMAA | 1 | 36.4 | 119 | | | | | |
| | TMPTA | 3 | 36.6 | 62 | | | | | |
| | 4-HBA | 1 | 37.0 | −32 | | | | | |
| | EOTMPTA | 3 | 37.9 | −40 | | 9 | | | |
| | PEA | 1 | 39.2 | 2 | | | | | |
| | NVC | 1 | 38.6 | 135 | N1 | 12 | 5 | 10 | 20 |

| | Type | Example C75 C75 | Example C76 C76 | Example C77 C77 | Example C78 C78 | Example C79 C79 | Example C80 C80 |
|---|---|---|---|---|---|---|---|
| | | | | C ink | | | |
| Photo-polymer-izable monomer | ISTA | | | | | | |
| | NA | | | | | | |
| | STA | | | | | | 30 |
| | TMCHA | 54.6 | 54.6 | 49.6 | 44.6 | 41.6 | |
| | OA | | | | | | |
| | INA | | | | | | |
| | IOA | | | | | | |
| | IDA | | | | | | |
| | TBCHA | | | | | | |
| | TDA | | | | | | |
| | LA | | | | | | 32.6 |
| | EOEOEA | | | | | | |
| | MEDOL10 | | | | | | |
| | IBOA | | 20 | 20 | 20 | 20 | |
| | APG200 | | | | | | |
| | NPGPODA | | | | | | |
| | DVE-3 | | | | | | |
| | APG400 | | | | | | |
| | DPGDA | | | | | | |
| | 3MPDDA | | | | | | |
| | VEEA | | | | | | |
| | SR595 | | | | | | |
| | HDDA | | | | | | |
| | CTFA | | | | | | |
| | POTMPTA | | | | | | |
| | SR355 | | | | | | |
| | DMAA | | | | | | |
| | TMPTA | | | | | | |
| | 4-HBA | | | | | | |
| | EOTMPTA | | | | | | |
| | PEA | | | | | | |
| | NVC | 25 | 5 | 10 | 15 | 18 | 15 |

TABLE 8-continued

|  |  | Example C71 | Example C72 | Example C73 | Example C74 | Example C75 | Example C76 | Example C77 | Example C78 | Example C79 | Example C80 |
|---|---|---|---|---|---|---|---|---|---|---|---|
| Colorant dispersion | Cyan mill base C | 8 | 8 | 8 | 8 | 8 | 8 | 8 | 8 | 8 | 8 |
| Photopolymerization initiator | Omnirad 819 | 3 | 3 | 3 | 3 | 3 | 3 | 3 | 3 | 3 | 3 |
|  | Omnirad TPO P initiator 2 | 7 | 7 | 7 | 7 | 7 | 7 | 7 | 7 | 7 | 7 |
| Sensitizer | ITX | 2 | 2 | 2 | 2 | 2 | 2 | 2 | 2 | 2 | 2 |
|  | Speedcure 7010 |  |  |  |  |  |  |  |  |  |  |
| Gelling agent | UNISTER M-2222SL |  |  |  |  |  |  |  |  |  | 1 |
|  | KAO WAX T1 |  |  |  |  |  |  |  |  |  | 1 |
|  | UNISTER H-476 |  |  |  |  |  |  |  |  |  |  |
| Polymerization inhibitor | UV-12 | 0.4 | 0.4 | 0.4 | 0.4 | 0.4 | 0.4 | 0.4 | 0.4 | 0.4 | 0.4 |
| Surfactant | BYK307 |  |  |  |  |  |  |  |  |  |  |
| Mass ratio [Monomer A1/Monomer N1] |  | 3.1 | 14.9 | 7.0 | 3.0 | 2.2 | 10.9 | 5.0 | 3.0 | 2.3 | 4.2 |
| Average surface tension of photopolymerizable monomer [mN/m] |  | 30.9 | 28.2 | 28.8 | 30.2 | 30.9 | 29.1 | 29.8 | 30.5 | 30.9 | 30.1 |
| Average Tg of photopolymerizable monomer [° C.] |  | 49 | 36 | 42 | 55 | 61 | 52 | 58 | 65 | 68 | 28 |
| Primary color evaluation | Graininess | 5 | 4 | 5 | 5 | 5 | 5 | 5 | 5 | 5 | 4 |
|  | Glossiness | 5 | 3 | 4 | 5 | 5 | 4 | 5 | 5 | 5 | 5 |
|  | Adhesiveness | 5 | 4 | 5 | 5 | 4 | 5 | 5 | 4 | 4 | 4 |
| Secondary color evaluation (C→M) | M ink | M71 | M72 | M73 | M74 | M75 | M76 | M77 | M78 | M79 | M80 |
|  | Graininess | 5 | 4 | 5 | 5 | 5 | 5 | 5 | 5 | 5 | 4 |
|  | Glossiness | 5 | 3 | 4 | 5 | 5 | 4 | 5 | 5 | 5 | 5 |
|  | Adhesiveness | 5 | 4 | 5 | 5 | 4 | 5 | 5 | 4 | 4 | 4 |
| Secondary color evaluation (C→Y) | Y ink | Y71 | Y72 | Y73 | Y74 | Y75 | Y76 | Y77 | Y78 | Y79 | Y80 |
|  | Graininess | 5 | 4 | 5 | 5 | 5 | 5 | 5 | 5 | 5 | 4 |
|  | Glossiness | 5 | 3 | 4 | 5 | 5 | 4 | 5 | 5 | 5 | 5 |
|  | Adhesiveness | 5 | 4 | 5 | 5 | 4 | 5 | 5 | 4 | 4 | 4 |

TABLE 9

|  |  | Number of functional groups | Surface tension | Tg | Category | Example C81 | Example C82 | Example C83 | Example C84 |
|---|---|---|---|---|---|---|---|---|---|
|  | Type |  |  |  |  | C81 | C82 | C83 | C84 |
|  |  |  |  |  |  |  | C ink |  |  |
| Photopolymerizable monomer | ISTA | 1 | 26.3 | −18 | A1 |  |  |  | 64.6 |
|  | NA | 1 | 26.5 | −37 |  |  |  |  |  |
|  | STA | 1 | 26.6 | 30 |  |  | 30 | 30 | 30 |
|  | TMCHA | 1 | 27.3 | 29 |  |  |  |  |  |
|  | OA | 1 | 27.5 | −65 |  |  |  |  |  |
|  | INA | 1 | 27.5 | −58 |  |  |  |  |  |
|  | IOA | 1 | 28.0 | −54 |  |  |  |  |  |
|  | IDA | 1 | 28.3 | −62 |  |  |  |  |  |
|  | TBCHA | 1 | 28.5 | 65 |  |  |  |  |  |
|  | TDA | 1 | 28.9 | −55 |  |  |  |  |  |
|  | LA | 1 | 29.3 | −23 |  |  | 32.6 | 34.6 | 34.59 |
|  | EOEOEA | 1 | 30.1 | −67 |  |  |  |  |  |
|  | MEDOL10 | 1 | 31.0 | −7 |  |  |  |  |  |
|  | IBOA | 1 | 31.3 | 96 | A2 |  |  |  |  |
|  | APG200 | 2 | 32.0 | 90 |  |  |  |  |  |
|  | NPGPODA | 2 | 32.0 | 32 |  |  |  |  |  |
|  | DVE-3 | 2 | 32.2 | 10 |  |  |  |  |  |
|  | APG400 | 2 | 32.2 | −8 |  |  |  |  |  |
|  | DPGDA | 2 | 33.0 | 104 |  |  |  |  |  |
|  | 3MPDDA | 2 | 33.1 | 50 |  |  |  |  |  |
|  | VEEA | 2 | 33.3 | 10 |  |  |  |  |  |
|  | SR595 | 2 | 33.4 | 20 |  |  |  |  |  |
|  | HDDA | 2 | 34.0 | 43 |  |  |  |  |  |
|  | CTFA | 1 | 34.1 | 27 |  |  |  |  |  |
|  | POTMPTA | 3 | 34.4 | −15 |  |  |  |  |  |
|  | SR355 | 4 | 36.0 | 98 |  |  |  |  |  |
|  | DMAA | 1 | 36.4 | 119 |  |  |  |  |  |
|  | TMPTA | 3 | 36.6 | 62 |  |  |  |  |  |
|  | 4-HBA | 1 | 37.0 | −32 |  |  |  |  |  |
|  | EOTMPTA | 3 | 37.9 | −40 |  |  |  |  |  |
|  | PEA | 1 | 39.2 | 2 |  |  |  |  |  |
|  | NVC | 1 | 38.6 | 135 | N1 | 15 | 15 | 15 | 15 |

TABLE 9-continued

|  |  | Example C85 | Comp. Example CR1 | Comp. Example CR2 | Comp. Example CR3 C ink | Comp. Example CR4 | Comp. Example CR5 | Comp. Example CR6 |
|---|---|---|---|---|---|---|---|---|
|  | Type | C85 | CR1 | CR2 | CR3 | CR4 | CR5 | CR6 |
| Photo-polymer-izable monomer | ISTA | 64.6 |  |  |  |  |  |  |
|  | NA |  |  |  |  |  |  |  |
|  | STA |  |  |  | 15.6 |  |  |  |
|  | TMCHA |  |  |  | 44.9 |  | 26.6 |  |
|  | OA |  |  |  |  |  |  |  |
|  | INA |  |  |  |  |  |  | 26.6 |
|  | IOA |  |  |  |  |  |  |  |
|  | IDA |  |  | 8.5 |  |  |  |  |
|  | TBCHA |  |  |  |  |  |  |  |
|  | TDA |  |  |  |  | 59 |  |  |
|  | LA |  | 28.6 |  |  |  |  |  |
|  | EOEOEA |  |  |  |  |  | 32 | 32 |
|  | MEDOL10 |  |  |  |  |  |  |  |
|  | IBOA |  | 45 | 45 |  |  |  |  |
|  | APG200 |  |  |  |  |  |  |  |
|  | NPGPODA |  |  | 5 |  |  |  |  |
|  | DVE-3 |  |  |  |  |  |  |  |
|  | APG400 |  |  |  |  |  |  |  |
|  | DPGDA |  |  |  |  |  |  |  |
|  | 3MPDDA |  |  |  |  |  |  |  |
|  | VEEA |  |  |  |  |  |  |  |
|  | SR595 |  |  |  |  |  |  |  |
|  | HDDA |  |  |  |  |  |  |  |
|  | CTFA |  |  |  |  |  |  |  |
|  | POTMPTA |  |  |  | 10 |  |  |  |
|  | SR355 |  |  |  |  |  |  |  |
|  | DMAA |  |  |  |  |  |  |  |
|  | TMPTA |  | 12 |  |  |  |  |  |
|  | 4-HBA |  |  |  |  |  |  |  |
|  | EOTMPTA |  |  |  |  |  |  |  |
|  | PEA |  |  | 9.6 |  |  |  |  |
|  | NVC | 15 |  | 14.5 | 15 | 20.6 | 21 | 21 |

|  |  | Example C81 | Example C82 | Example C83 | Example C84 | Example C85 | Comparative Example CR1 |
|---|---|---|---|---|---|---|---|
| Colorant dispersion | Cyan mill base C | 8 | 8 | 8 | 8 | 8 | 8 |
| Photopolymerization initiator | Omnirad 819 | 3 | 3 | 3 |  |  | 4 |
|  | Omnirad TPO | 7 | 7 | 7 |  |  |  |
|  | P initiator 2 |  |  |  | 10 | 10 |  |
| Sensitizer | ITX | 2 |  | 2 | 2 |  | 2 |
|  | Speedcure 7010 |  | 2 |  |  | 2 |  |
| Gelling agent | UNISTER M-2222SL |  |  |  |  |  |  |
|  | KAO WAX T1 |  |  |  |  |  |  |
|  | UNISTER H-476 | 2 |  |  |  |  |  |
| Polymerization inhibitor | UV-12 | 0.4 | 0.4 | 0.4 | 0.4 | 0.4 | 0.4 |
| Surfactant | BYK307 |  |  | 0.01 |  |  |  |
| Mass ratio [Monomer A1/Monomer N1] |  | 4.2 | 4.3 | 4.3 | 4.3 | 4.3 | — |
| Average surface tension of photopolymerizable monomer [mN/m] |  | 30.1 | 29.5 | 28.5 | 28.7 | 28.7 | 31.4 |
| Average Tg of photopolymerizable monomer [° C.] |  | 28 | 27 | 27 | 12 | 12 | 51 |
| Primary color evaluation | Graininess | 4 | 5 | 4 | 5 | 5 | 2 |
|  | Glossiness | 5 | 5 | 4 | 4 | 5 | 2 |
|  | Adhesiveness | 4 | 4 | 4 | 4 | 4 | 4 |
| Secondary color evaluation (C→M) | M ink | M81 | M82 | M83 | M84 | M85 | MR1 |
|  | Graininess | 4 | 5 | 3 | 5 | 5 | 2 |
|  | Glossiness | 5 | 5 | 3 | 4 | 5 | 2 |
|  | Adhesiveness | 4 | 4 | 4 | 4 | 4 | 4 |
| Secondary color evaluation (C→Y) | Y ink | Y81 | Y82 | Y83 | Y84 | Y85 | YR1 |
|  | Graininess | 4 | 5 | 3 | 5 | 5 | 2 |
|  | Glossiness | 5 | 5 | 3 | 4 | 5 | 2 |
|  | Adhesiveness | 4 | 4 | 4 | 4 | 4 | 4 |

TABLE 9-continued

|  |  | Comparative Example CR2 | Comparative Example CR3 | Comp. Example CR4 | Comp. Example CR5 | Comp. Example CR6 |
|---|---|---|---|---|---|---|
| Colorant dispersion | Cyan mill base C | 4.35 | 8 | 8 | 8 | 8 |
| Photopolymerization initiator | Omnirad 819 |  | 4 | 3 | 3 | 3 |
|  | Omnirad TPO | 9.15 |  | 7 | 7 | 7 |
|  | P initiator 2 |  |  |  |  |  |
| Sensitizer | ITX |  | 2 | 2 | 2 | 2 |
|  | Speedcure 7010 | 3.5 |  |  |  |  |
| Gelling agent | UNISTER M-2222SL |  |  |  |  |  |
|  | KAO WAX T1 |  |  |  |  |  |
|  | UNISTER H-476 |  |  |  |  |  |
| Polymerization inhibitor | UV-12 | 0.4 | 0.4 | 0.4 | 0.4 | 0.4 |
| Surfactant | BYK307 |  | 0.1 |  |  |  |
| Mass ratio [Monomer A1/Monomer N1] |  | 0.6 | 4.0 | 2.9 | 2.8 | 2.8 |
| Average surface tension of photopolymerizable monomer [mN/m] |  | 33.9 | 30.1 | 31.4 | 31.4 | 31.5 |
| Average Tg of photopolymerizable monomer [° C.] |  | 72 | 42 | −4 | 19 | −9 |
| Primary color evaluation | Graininess | 2 | 5 | 2 | 2 | 2 |
|  | Glossiness | 1 | 5 | 2 | 2 | 2 |
|  | Adhesiveness | 4 | 4 | 2 | 2 | 2 |
| Secondary color evaluation (C→M) | M ink | MR2 | MR3 | MR4 | MR5 | MR6 |
|  | Graininess | 2 | 1 | 2 | 2 | 2 |
|  | Glossiness | 1 | 1 | 2 | 2 | 2 |
|  | Adhesiveness | 4 | 4 | 2 | 2 | 2 |
| Secondary color evaluation (C→Y) | Y ink | YR2 | YR3 | YR4 | YR5 | YR6 |
|  | Graininess | 2 | 1 | 2 | 2 | 2 |
|  | Glossiness | 1 | 1 | 2 | 2 | 2 |
|  | Adhesiveness | 4 | 4 | 2 | 2 | 2 |

Description of Tables 1 to 9

The number of the functional groups included in each of the photopolymerizable monomers, the surface tension (mN/m) of the photopolymerizable monomer, and the Tg (° C.) of a homopolymer of the photopolymerizable monomer were as described in Tables 1 to 9.

In the column "Category", "A1", "A2", and "N1" refer to the monomers A1, A2, and N1, respectively.

The values in each of the rows of the constituents are the mass percentages of the constituent relative to the total amounts of the inks. The blanks mean that the ink did not contain the corresponding constituents.

The meanings of the abbreviations used for expressing photopolymerizable monomers are as follows.

Monomer A1

ISTA . . . Isostearyl acrylate, which includes an alkyl group having 18 carbon atoms
NA . . . n-Nonyl acrylate, which includes an alkyl group having 9 carbon atoms
STA . . . n-Stearyl acrylate, which includes an alkyl group having 18 carbon atoms
TMCHA . . . 3,5,5-Trimethylcyclohexyl acrylate, which includes an alicyclic structure including a six-membered ring
OA . . . n-Octyl acrylate, which includes an alkyl group having 8 carbon atoms
INA . . . Isononyl acrylate, which includes an alkyl group having 9 carbon atoms
IOA . . . Isooctyl acrylate, which includes an alkyl group having 8 carbon atoms
IDA . . . Isodecyl acrylate, which includes an alkyl group having 10 carbon atoms
TBCHA . . . 4-t-Butylcyclohexyl acrylate, which includes an alicyclic structure including a six-membered ring
TDA . . . Tridecyl acrylate, which includes an alkyl group having 10 carbon atoms
LA . . . n-Lauryl acrylate, which includes an alkyl group having 12 carbon atoms
EOEOEA . . . Ethoxyethoxyethyl acrylate, which includes an alkyl group having 2 carbon atoms
MEDOL10 . . . "MEDOL10" produced by Osaka Organic Chemical Industry Ltd., (2-methyl-2-ethyl-1,3-dioxolan-4-yl)methyl acrylate, which includes an alkyl group having 2 carbon atoms Monomer A2

IBOA . . . Isobornyl acrylate
APG200 . . . "APG200" produced by Shin-Nakamura Chemical Co., Ltd., tripropylene glycol diacrylate
NPGPODA . . . Propoxylated (2) neopentyl glycol diacrylate, "SR9003" produced by Sartomer
DVE . . . 3 "DVE-3" produced by BASF SE, triethylene glycol divinyl ether
APG400 . . . "APG400" produced by Shin-Nakamura Chemical Co., Ltd., polypropylene glycol #400 diacrylate
DPGDA . . . dipropylene glycol diacrylate
3MPDDA . . . 3-Methyl-1,5-pentanediol diacrylate
VEEA . . . 2-(2-Vinyloxyethoxy)ethyl acrylate
SR595 . . . "SR595" produced by Sartomer, 1,10-decanediol diacrylate
HDDA . . . 1,6-Hexanediol diacrylate, "SR238" produced by Sartomer
CTFA . . . Cyclic trimethylolpropane formal acrylate, "Biscoat #200" produced by Osaka Organic Chemical Industry Ltd.

POTMPTA . . . Propoxylated (3) trimethylolpropane triacrylate, "SR492" produced by Sartomer SR355 . . . "SR355" produced by Sartomer, ditrimethylolpropane tetraacrylate DMAA . . . Dimethylacrylamide TMPTA . . . Trimethylolpropane triacrylate 4-HBA . . . 4-Hydroxybutyl acrylate EOTMPTA . . . Ethoxylated (3) trimethylolpropane triacrylate, "SR454" produced by Sartomer PEA . . . 2-Phenoxyethyl acrylate EO6TMPTA . . . Ethoxylated (6) trimethylolpropane triacrylate, "SR499" produced by Sartomer EO9TMPTA . . . Ethoxylated (9) trimethylolpropane triacrylate, "SR502" produced by Sartomer A-400 . . . "A-400" produced by Shin-Nakamura Chemical Co., Ltd., polyethylene glycol #400 diacrylate Monomer N1

NVC . . . N-Vinylcaprolactam

Details of the photopolymerization initiators, the sensitizers, the gelling agents, the polymerization inhibitor, and the surfactant are as follows.

Omnirad 819 . . . "Omnirad (registered trademark) 819" produced by IGM Resins B.V., bis(2,4,6-trimethylbenzoyl)phenylphosphine oxide Omnirad TPO . . . "Omnirad (registered trademark) TPO" produced by IGM Resins B.V., 2,4,6-trimethylbenzoyldiphenylphosphine oxide Speedcure 7010 . . . "Speedcure 7010" produced by Lambson, 1,3-di({α-[1-chloro-9-oxo-9H-thioxanthen-4-yl] oxy}acetylpoly[oxy(1-methylethylene)] oxy)-2,2-bis({α-[1-chloro-9-oxo-9H-thioxanthen-4-yl] oxy}acetylpoly[oxy(1-methylethylene)] oxymethyl) propane (CAS No. 1003567-83-6)

ITX . . . 2-Isopropylthioxanthone

P initiator 2 . . . The above-described P initiator 2 (a specific example of the compound represented by Formula (1) which serves as a high-molecular-weight photopolymerization initiator)

UNISTER M-2222SL . . . "UNISTER (registered trademark) M-2222SL" produced by NOF CORPORATION, behenyl behenate KAO WAX T1 . . . "KAO WAX T1" produced by Kao Corporation, distearyl ketone UNISTER H-476 . . . "UNISTER (registered trademark) H-476" produced by NOF CORPORATION, pentaerythritol tetrastearate UV-12 . . . "FLORSTAB UV12" produced by Kromachem, nitroso polymerization inhibitor, tris(N-nitroso-N-phenylhydroxylamine) aluminum salt BYK307 . . . "BYK 307" produced by BYK chemie, silicone surfactant As described in Tables 1 to 9, the images formed in Examples C1 to C85, where a C ink was used that included a photopolymerizable monomer, a photopolymerization initiator, and a colorant, wherein the photopolymerizable monomer included a monomer A1 having a surface tension of 31.0 mN/m or less, the photopolymerizable monomer had an average surface tension of 31.0 mN/m or less, and the content of the surfactant was 0.01% by mass or less, were excellent in terms of graininess, glossiness, and adhesiveness.

In contrast, in Comparative Examples CR1, CR2, and CR4 to CR6, where the photopolymerizable monomer included in the C ink had an average surface tension of more than 31.0 mN/m, the image was poor in terms of graininess and glossiness. In particular, a comparison between Comparative Example CR4 and Example C10, a comparison between Comparative Example CR5 and Example C31, and a comparison between Comparative Example CR6 and Example C41 show that the images formed in Comparative Examples CR4 to CR6, where the average surface tension of the photopolymerizable monomer was more than 31.0 mN/m, were poorer in terms of graininess and glossiness than the images formed in Examples C10, C31, and C41. This is presumably because the C ink failed to spread to a sufficient degree.

In Comparative Example CR3, where the content of the surfactant in the C ink was more than 0.01% by mass, the secondary color image was poor in terms of graininess and glossiness. This is presumably because the surfactant bled on the surface of the C ink film as a result of the pinning exposure of the C ink used as a first color ink and, consequently, the second color ink failed to spread on the C ink film to a sufficient degree.

For example, the results obtained in Examples C1 to C10 show that the image was further improved in terms of graininess and glossiness in the case where the monomer A1 included an alicyclic structure (Examples C4 and C9).

For example, the results obtained in Examples C1 to C10 show that the image was further improved in terms of graininess, glossiness, and adhesiveness in the case where the homopolymer of the monomer A1 had a glass transition temperature (Tg) of 20° C. or more (Examples C3, C4, and C9).

For example, the results obtained in Examples C72 to C75 show that the image was further improved in terms of graininess and glossiness in the case where the photopolymerizable monomer included the monomer N1 (N-vinyl compound) and the mass ratio [Monomer A1/Monomer N1] was 2.0 to 7.0 (Examples C73 to C75).

For example, the results obtained in Examples C19 to C83 show that the image (in particular, the secondary color image) was further improved in terms of graininess and glossiness in the case where the content of the surfactant was 0.0001% by mass or less of the total amount of the active energy ray-curable ink (Example C19).

The overall results obtained in Examples C1 to C85 show that the image was further improved in terms of graininess, glossiness, and adhesiveness in the case where the homopolymer of the photopolymerizable monomer had an average glass transition temperature (Tg) of 20° C. or more.

Examples M1 to M85 and Comparative Examples MR1 to MR6

In Examples M1 to M85 and Comparative Examples MR1 to MR6, evaluations (i.e., evaluations of graininess, glossiness, and adhesiveness) of magenta primary color images were conducted as in Examples C1 to C85 and Comparative Examples CR1 to CR6, respectively, except that the inks C1 to C85 and CR1 to CR6 were changed to the inks M1 to M85 and MR1 to MR6, respectively.

Furthermore, evaluations (i.e., evaluations of graininess, glossiness, and adhesiveness) of secondary color images (M→C) were conducted as in Examples C1 to C85 and Comparative Examples CR1 to CR6, respectively, except that the inks M1 to M85 and MR1 to MR6 were used as a first color ink and the inks C1 to C85 and CR1 to CR6 were used as a second color ink, respectively.

Although the description of detailed results is omitted herein, results similar to those obtained in Examples C1 to C85 were obtained in Examples M1 to M85, respectively.

Examples Y1 to Y85 and Comparative Examples YR1 to YR6

In Examples Y1 to Y85 and Comparative Examples YR1 to YR6, evaluations (i.e., evaluations of graininess, glossiness, and adhesiveness) of yellow primary color images were conducted as in Examples C1 to C85 and Comparative Examples CR1 to CR6, respectively, except that the inks C1 to C85 and CR1 to CR6 were changed to the inks Y1 to Y85 and YR1 to YR6, respectively.

Furthermore, evaluations (i.e., evaluations of graininess, glossiness, and adhesiveness) of secondary color images (Y→K) were conducted as in Examples C1 to C85 and Comparative Examples CR1 to CR6, respectively, except that the inks Y1 to Y85 and YR1 to YR6 were used as a first color ink and the inks K1 to K85 and KR1 to KR6 were used as a second color ink, respectively.

Although the description of detailed results is omitted herein, results similar to those obtained in Examples C1 to C85 were obtained in Examples Y1 to Y85, respectively.

Examples K1 to K85 and Comparative Examples KR1 to KR6

In Examples K1 to K85 and Comparative Examples KR1 to KR6, evaluations (i.e., evaluations of graininess, glossiness, and adhesiveness) of black primary color images were conducted as in Examples C1 to C85 and Comparative Examples CR1 to CR6, respectively, except that the inks C1 to C85 and CR1 to CR6 were changed to the inks K1 to K85 and KR1 to KR6, respectively.

Although the description of detailed results is omitted herein, results similar to those obtained in Examples C1 to C85 were obtained in Examples K1 to K85, respectively.

Japanese Patent Application No. 2019-204275 filed on Nov. 11, 2019, is incorporated herein by reference in its entirety.

All documents, patent applications, and technical standards referred to herein are incorporated herein by reference in their entirety to the same extent as when the individual documents, patent applications, and technical standards are specifically and individually indicated to be incorporated by reference in its entirety.

What is claimed is:

1. An active energy ray-curable ink comprising:
   a photopolymerizable monomer;
   a photopolymerization initiator; and
   a colorant,
   wherein the photopolymerizable monomer includes a monomer A1 having a surface tension of 31.0 mN/m or less,
   wherein the photopolymerizable monomer has an average surface tension of 31.0 mN/m or less, and
   wherein the active energy ray-curable ink optionally further includes a surfactant at a content of 0.01% by mass or less of a total amount of the active energy ray-curable ink,
   wherein a homopolymer of the photopolymerizable monomer has an average glass transition temperature of 20° C. or more.

2. The active energy ray-curable ink according to claim 1, wherein at least one of the monomer A1 includes an alkyl group.

3. The active energy ray-curable ink according to claim 1, wherein at least one of the monomer A1 includes an alicyclic structure.

4. The active energy ray-curable ink according to claim 1, wherein a homopolymer of at least one of the monomer A1 has a glass transition temperature of 20° C. or more.

5. The active energy ray-curable ink according to claim 1, wherein the photopolymerizable monomer further includes a monomer N1 that is an N-vinyl compound.

6. The active energy ray-curable ink according to claim 5, wherein a mass ratio of a content of the monomer A1 to a content of the monomer N1 is 2.0 to 7.0.

7. The active energy ray-curable ink according to claim 1, wherein the content of the surfactant is 0.0001% by mass or less of the total amount of the active energy ray-curable ink.

8. The active energy ray-curable ink according to claim 1, wherein the average surface tension of the photopolymerizable monomer is 28 to 31 mN/m.

9. The active energy ray-curable ink according to claim 1, further comprising a gelling agent.

10. An ink set comprising:
    a first ink that is the active energy ray-curable ink according to claim 1; and
    a second ink that is an active energy ray-curable ink including a photopolymerizable monomer, a photopolymerization initiator, and a colorant.

11. An ink set comprising:
    a first ink; and
    a second ink,
    wherein the first and second inks are each independently the active energy ray-curable ink according to claim 1.

12. An image recording method comprising:
    applying the active energy ray-curable ink according to claim 1 to a recording medium to form an ink film; and
    irradiating the ink film with an active energy ray.

* * * * *